United States Patent
Chai et al.

(10) Patent No.: US 10,924,965 B2
(45) Date of Patent: Feb. 16, 2021

(54) RADIO RESOURCE MANAGEMENT METHOD AND APPARATUS

(71) Applicant: Huawei Technologies Co., Ltd., Guangdong (CN)

(72) Inventors: Li Chai, Shenzhen (CN); Hong Wang, Beijing (CN); Jian Zhang, Beijing (CN); Wei Quan, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/145,631

(22) Filed: Sep. 28, 2018

(65) Prior Publication Data
US 2019/0045398 A1   Feb. 7, 2019

Related U.S. Application Data

(63) Continuation of application No. PCT/CN2016/078344, filed on Apr. 1, 2016.

(51) Int. Cl.
*H04W 28/16* (2009.01)
*H04W 16/14* (2009.01)
(Continued)

(52) U.S. Cl.
CPC .......... *H04W 28/16* (2013.01); *H04B 17/309* (2015.01); *H04L 5/0057* (2013.01);
(Continued)

(58) Field of Classification Search
CPC ..... H04W 28/16; H04W 76/15; H04W 76/10; H04W 16/14; H04W 72/085;
(Continued)

(56) References Cited

U.S. PATENT DOCUMENTS

2013/0322279 A1* 12/2013 Chincholi ............. H04W 24/10
                                                              370/252
2014/0056243 A1*  2/2014 Pelletier ................ H04W 74/04
                                                              370/329
(Continued)

FOREIGN PATENT DOCUMENTS

CN       104349300 A      2/2015
CN       104797000 A      7/2015
(Continued)

OTHER PUBLICATIONS

Ericsson (Rapporteur), "Summary of email discussion [82#17][LTE/SCE] Control plane aspects," Tdoc R2-132691, 3GPP TSG-RAN WG2 #83, Barcelona, Spain, Aug. 19-23, 2013, 28 pages.
(Continued)

*Primary Examiner* — Jung H Park
(74) *Attorney, Agent, or Firm* — Conley Rose, P.C.

(57) ABSTRACT

A radio resource management method and apparatus are disclosed, to reduce, in a multi-connectivity scenario, load existing in radio resource management message exchange between network devices. In some feasible implementations of the present disclosure, the method includes: configuring, by a network control device, a network device set for user equipment, where the set includes a first network device and a second network device, the first network device and the second network device respectively include a first resource management entity and a second resource management entity; and further configuring, by the network control device, a third resource management entity on the user equipment, where the first resource management entity and the second resource management entity are used to exchange resource management messages with the third resource management entity on the user equipment, where the
(Continued)

A network control device sends a first configuration message to a network device set  — 301

The network control device sends a second configuration message to user equipment — 302 resource management message is used for radio resource management.

20 Claims, 6 Drawing Sheets

(51) Int. Cl.
| | | |
|---|---|---|
| H04W 76/10 | (2018.01) | |
| H04W 76/15 | (2018.01) | |
| H04B 17/309 | (2015.01) | |
| H04W 76/27 | (2018.01) | |
| H04L 5/00 | (2006.01) | |
| H04W 24/08 | (2009.01) | |
| H04W 24/10 | (2009.01) | |
| H04W 72/08 | (2009.01) | |
| H04W 84/04 | (2009.01) | |
| H04W 80/02 | (2009.01) | |
| H04W 80/08 | (2009.01) | |

(52) U.S. Cl.
CPC ........... *H04W 16/14* (2013.01); *H04W 24/08* (2013.01); *H04W 24/10* (2013.01); *H04W 72/085* (2013.01); *H04W 76/10* (2018.02); *H04W 76/15* (2018.02); *H04W 76/27* (2018.02); *H04W 80/02* (2013.01); *H04W 80/08* (2013.01); *H04W 84/04* (2013.01)

(58) Field of Classification Search
CPC ..... H04W 24/10; H04W 24/08; H04W 76/27; H04W 84/04; H04W 80/08; H04W 80/02; H04L 5/0057; H04B 17/309
See application file for complete search history.

(56) References Cited

U.S. PATENT DOCUMENTS

| | | | |
|---|---|---|---|
| 2014/0192775 A1 | 7/2014 | Li et al. | |
| 2014/0315593 A1* | 10/2014 | Vrzic | H04W 52/38 455/522 |
| 2015/0215923 A1 | 7/2015 | Jha et al. | |
| 2016/0212662 A1 | 7/2016 | Lee et al. | |
| 2016/0337925 A1* | 11/2016 | Fujishiro | H04W 16/32 |
| 2016/0338138 A1 | 11/2016 | Pelletier et al. | |
| 2016/0345190 A1 | 11/2016 | Chen et al. | |
| 2017/0195935 A1* | 7/2017 | Xu | H04W 36/08 |

FOREIGN PATENT DOCUMENTS

| | | |
|---|---|---|
| CN | 104811984 A | 7/2015 |
| CN | 105052241 A | 11/2015 |
| CN | 104770032 B | 10/2018 |
| EP | 2806689 A1 | 11/2014 |
| JP | 2015530042 A | 10/2015 |
| WO | 2014/206445 A1 | 12/2014 |
| WO | 2015115629 A1 | 8/2015 |
| WO | 2015138069 A1 | 9/2015 |

OTHER PUBLICATIONS

Ericsson (Rapporteur), "TP related to email discussion [82#17][LTE/SCE-HL] Control Plane aspects," Tdoc R2-132692, 3GPP TSG-RAN WG2 #83, Barcelona, Spain, Aug. 19-23, 2013, 3 pages.
3GPP TS 36.213 V13.1.1 (Mar. 2016), Technical Specification, 3rd Generation Partnership Project; Technical Specification Group Radio Access Network; Evolved Universal Terrestrial Radio Access (E-UTRA); Physical layer procedures (Release 13), Mar. 2016, 361 pages.
3GPP TS 36.300 V13.2.0 (Dec. 2015), Technical Specification, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13), Dec. 2015, 290 pages.
Foreign Communication From a Counterpart Application, Japanese Application No. 2018-551212, Japanese Office Action dated Aug. 26, 2019, 4 pages.
Foreign Communication From a Counterpart Application, Japanese Application No. 2018-551212, English Translation of Japanese Office Action dated Aug. 26, 2019, 4 pages.

* cited by examiner

RADIO RESOURCE MANAGEMENT METHOD AND APPARATUS

CROSS-REFERENCE TO RELATED APPLICATIONS

This application is a continuation of International Application No. PCT/CN2016/078344, filed on Apr. 1, 2016, the disclosure of which is hereby incorporated by reference in its entirety.

TECHNICAL FIELD

The present disclosure relates to the field of communications technologies, and specifically, to a radio resource management method and apparatus.

BACKGROUND

With rapid development of mobile broadband (MBB) and popularization of smartphones, the mobile Internet is rapidly and deeply changing and enriching people's life. As indicated by wireless network statistical data, a compound annual growth rate of global mobile data traffic is up to 60%, and in addition, network traffic distribution is extremely imbalanced, and capacity requirements of hotspot regions increase explosively.

Based on the foregoing requirements, to provide a relatively high system capacity for a hotspot region, micro cells are usually deployed in the hotspot region. A service is provided for a mobile user in the hotspot region by using the micro cell, so that a mobile communications network is a heterogeneous network (HetNet). First, a macro cell may be created by using a macro base station, to implement large-area continuous network coverage. Then, micro cells are created by using a large quantity of dense micro base stations in the hotspot region, to implement overlapping coverage, and the micro cells provide a relatively high system capacity.

In this scenario, user equipment (UE) establishes a connection to a plurality of eNBs, and this is referred to as multi-connectivity. In a multi-connectivity scenario, one master eNB (MeNB) and at least one secondary eNB (SeNB) are included. Only the MeNB can generate a radio resource control (RRC) message used for UE configuration, the SeNB accepts configuration management by the MeNB, and the MeNB and the SeNB need to exchange a large amount of information.

It is found through practice that in the multi-connectivity scenario, changes between eNBs and cells become more frequent, service resource management is more tedious and complex, and load existing in information exchange between the MeNB and different SeNBs is increased.

SUMMARY

Embodiments of the present disclosure provide a radio resource management method and apparatus, to reduce, in a multi-connectivity scenario, load existing in radio resource management message exchange between network devices.

To resolve the foregoing problem, a first aspect of the present disclosure provides a radio resource management method. The method is applied to a multi-connectivity scenario. A network control device may configure, for user equipment, a network device set including a plurality of network devices. Any network device in the set can establish a data-plane connection to the user equipment, at least two network devices in the set can establish a control-plane connection to the user equipment, and the at least two network devices may include a first network device and a second network device. A first resource management entity is configured on the first network device, and a second resource management entity is configured on the second network device. The first resource management entity and the second resource management entity are used to exchange resource management messages with the user equipment. The resource management message is used for radio resource management. The network control device sends a first configuration message to the network device set, to complete configuration of the network device set. After configuring the network device set, the network control device sends a second configuration message to the user equipment. The second configuration message is used to configure a third resource management entity on the user equipment. The third resource management entity is used to exchange, by the user equipment, the resource management messages with the first resource management entity and the second resource management entity. In this way the user equipment can establish a control-plane connection to and exchange a resource management message with the first network device and/or the second network device by using the third resource management entity. The resource management message is a message used for radio resource control and management and/or message used for network device configuration or user equipment configuration. After the method is used, in the multi-connectivity scenario, a plurality of network devices can establish control-plane connection to and exchange resource management messages with the UE, and the network device is not limited to an MeNB, so that load existing in information exchange between network devices, for example, between the MeNB and another SeNB, can be reduced.

The first resource management entity may be configured to configure the first network device, the second network device, and the user equipment. The network device set may further include N secondary network devices. The second resource management entity may be configured to configure the second network device, the user equipment, and the N secondary network devices, N is a positive integer.

Optionally the first network device is a network device that exchanges a resource management message the user equipment before the network control device configures the network device set for the user equipment. In this way, the network control device may configure, as the first resource management entity, a resource management entity that has been established on the first network device.

Optionally before the network control device configures the network device set for the user equipment, the method further includes: selecting, by the network control device, a network device with best channel quality other than the first network device as the second network device based on a measurement report of the user equipment; and instructing, by the network control device, the second network device to establish the second resource management entity.

The network control device may be the first network device, and the sending, by the network control device, a first configuration message to the network device set may include: sending, by the network control device, the first configuration message to another network device that includes the second network device and that is in the network device set.

Optionally, the second network device is a network device that exchanges a resource management message with the user equipment before the network control device configures the network device set for the user equipment. In this way, the network control device may configure, as the second resource management entity, resource management entity that has been established on the second network device.

Optionally, before the network control device configures the network device set for the user equipment, method further includes: selecting, the network control device, a network device with best channel quality other than the second network device as the first network device based on a measurement report of the user equipment; and instructing, by the network control device, the first network device to establish the first resource management entity.

Optionally, the measurement report includes at least one of the following items: reference signal received power (RSRP), reference signal received quality (RSRQ), a signal to interference plus noise ratio SINR), and a channel quality indicator (CQI).

Optionally, a first subset may include the second network device and the N secondary network devices, the first subset is a subset of the network device set, the second resource management entity may be configured to configure all network devices in the first subset, and all network devices in the first subset share the second resource management entity.

Optionally, that the network control device configures the network device set for the user equipment may further include: configuring, by the network control device, the first network device as a control-plane termination point between the first network device and a third network device, where the third network device includes a mobility management entity.

Optionally, that the network control device configures the network device set for the user equipment may further include: when the first network device is directly connected to a fourth network device, configuring, by the network control device, the first network device as a data-plane termination point between the first network device and the fourth network device, where the fourth network device includes a serving gateway.

Optionally, that the network control device configures the network device set for the user equipment may further configuring, by the network control device, the second network device to establish a data-plane connection to a fourth network device, where the fourth network device includes a serving gateway; or configuring, by the network control device, the second network device to establish a data-plane connection to the first network device.

Optionally, that the network control device configures the network device set for the user equipment may further include: configuring, by the network control device, any network device in the network device set to establish a data-plane connection to a fourth network device, where the fourth network device includes a serving gateway.

Optionally, that the network control device configures the network device set for the user equipment may further include: configuring the network control device, any network device other than the second network device in the first subset to establish a data-plane connection to the second network device; or configuring, by the network control device, any network device other than the second network device in the first subset to establish a data-plane connection to the first network device.

Optionally, that the network control device configures the network device set for the user equipment may further include: configuring, by the network control device, any network device in the network device set to establish a data-plane connection to the user equipment.

Optionally, that the network control device configures the network device set for the user equipment may further include configuring, by the network control device, a redundant set for the user equipment, where the redundant set includes one or more network devices. The network control device may perform status configuration for the redundant set, and the status configuration includes an active state and an inactive state.

Optionally, that the network control device configures the network device set for the user equipment may further include: configuring, the network control device, a monitored node set or a configuration set for the user equipment.

Optionally, the first resource management entity, the second resource management entity, and the third resource management entity may be specifically radio resource control RRC entities, the control-plane connection may be specifically an RRC connection, and the resource management message may be specifically an RRC message.

In the network device set, the first network device may be a master eNB MeNB, the other network device including the second network device may be a secondary eNB SeNB, and the second network device may be a master-secondary eNB M-SeNB in the secondary eNB.

A second aspect of the present disclosure provides a radio resource management method. The method is applied to a multi-connectivity scenario. A network control device may configure, for user equipment, a network device set including a plurality of network devices. Any network device in the set can establish a data-plane connection to the user equipment, at least two network devices in the set can establish a control-plane connection to the user equipment, and the at least two network devices may include a first network device and a second network device. The first network device includes a first resource management entity, and the second network device includes a second resource management entity. The first resource management entity and the second resource management entity are used to exchange resource management messages with the user equipment. The resource management message is used for radio resource management. The network control device may send a corresponding second configuration message to the user equipment. The user equipment may receive the second configuration message sent by the network control device, and establish a third resource management entity based on the second configuration message. The third resource management entity is used to exchange, by the user equipment, the resource management messages with the first resource management entity and the second resource management entity. In this way, the user equipment can establish a control-plane connection to and exchange a resource management message with the first network device and/or the second network device by using the third resource management entity. The resource management message is a message used for radio resource control and management and/or a message used for network device configuration or user equipment configuration. After the method is used, in the multi-connectivity scenario, a plurality of network devices can establish a control-plane connection to and exchange resource management messages with the UE, and the network device is not limited to an MeNB, so that load existing in information exchange between network devices, for example, between the MeNB and another SeNB, can be reduced.

The first resource management entity may be configured to configure the first network device, the second network device, and the user equipment. The network device set may further include N secondary network devices. The second resource management entity is used to configure the second network device, the user equipment, and the N secondary network devices, and N is a positive integer.

Optionally, the establishing a third resource management entity based on the second configuration message may include: establishing at least two third resource management entities based on the second configuration message, where two of the at least two third resource management entities are respectively corresponding to the first resource management entity and the second resource management entity; and the method further includes: concurrently exchanging, by the user equipment, the resource management messages with the first resource management entity and the second resource management entity by using the at least two third resource management entities.

Optionally, the establishing a third resource management entity based on the second configuration message may further include: establishing the third resource management entity based on the second configuration message, where the third resource management entity is corresponding to both the first resource management entity and the second resource management entity; and the method further includes exchanging, by the user equipment, the resource management messages with the first resource management entity and the second resource management entity in series by using the third resource management entity.

Optionally, the user equipment may send, to the first network device or the second network device, a resource management message that carries information indicating a destination network device, so that the first network device or the second network device receives the resource management message forwards the resource management message to the destination network device. The resource management message carries the information about the destination network device, so that the resource management message can be forwarded between network devices, and the resource management message can be effectively transmitted when quality of a channel between the user equipment and the destination network device is poor.

Optionally, the user equipment may pre-configure a plurality of logical channels, and a first logical channel and a second logical channel in the plural of logical channels are respectively corresponding to the first network device and the second network device. The user equipment may send a resource management message to the first network device by using the first logical channel, and/or send a resource management message to the second network device by using the second logical channel.

Optionally, the method may further include: sending, by the user equipment, a measurement report to the network control device, where the measurement report includes at least one of the following items: reference signal received power RSRP, reference signal received quality RSRQ, a signal to interference plus noise ratio SINR, and a channel quality indicator CQI.

A third aspect of the present disclosure provides a radio resource management method. The method is applied to a multi-connectivity scenario. A network control device may configure, for user equipment, a network device set including a plurality of network devices. Any network device in the set can establish a data-plane connection to the user equipment, at least network devices in the set can establish a control-plane connection to the user equipment, and the at least two network devices may include a first network device and a second network device. The first network device includes a first resource management entity, and the second network device includes a second resource management entity. The first resource management entity and the second resource management entity are used to exchange resource management messages with the user equipment. The resource management message is used for radio resource management. The network control device sends a first configuration message to the network device set, to complete configuration of the network device set. The second network device may receive the first configuration message sent by the network control device, and establish the second resource management entity based on the first configuration message. The second network device may exchange a resource management message with the user equipment by using the second resource management entity, and the resource management message is used for radio resource management. After the method is used, in the multi-connectivity scenario, a plurality of network devices can establish a control-plane connection to and exchange resource management messages with the UE, and the network device is not limited to an MeNB, so that load existing in information exchange between network devices, for example, between the MeNB and another SeNB, can be reduced.

Optionally, establishing a control-plane connection to and exchanging a resource management message with the user equipment by using the resource management entity may include: after establishing a control-plane connection to the user equipment by using the second resource management entity, receiving a resource management message sent by the user equipment, determining whether a destination network device of the resource management message is the network device; and if the destination network device of the resource management message is not the network device, forwarding the resource management message to the destination network device of the resource management message by using an X2 interface.

A fourth aspect of the present disclosure provides a radio resource management apparatus. The apparatus may be applied to a network control device. The apparatus may include a processing unit and a transceiver unit. The processing unit is configured to generate a first configuration message based on user equipment and a network device set, where the first configuration message is used to configure the network device set for the user equipment, the network device set includes a first network device and a second network device, the first network device includes a first resource management entity, the second network device includes a second resource management entity, the first resource management entity and the second resource management entity are used to exchange resource management messages with the user equipment, and the resource management message is used for radio resource management. The processing unit is further configured to generate a second configuration message for the user equipment, where the second configuration message is used to configure a third resource management entity on the user equipment, and the third resource management entity is used to exchange, by the user equipment, the resource management messages with the first resource management entity and the second resource management entity. The transceiver unit is configured to: send the first configuration message to the network device set, and send the second configuration message to the user equipment. In this way, in a multi-connectivity scenario, a plurality of network devices can establish a control-plane connection to and exchange resource management messages with the UE, and the network device is not limited to an MeNB, so that load existing in information exchange between network devices, for example, between the MeNB and another SNB, can be reduced. The radio resource management apparatus provided in the third aspect of the present disclosure may further include more optional solutions. For details, refer to related descriptions of the radio resource management method provided in the first aspect of the present disclosure.

A fifth aspect of the present disclosure provides a radio resource management apparatus. The apparatus may be applied to user equipment. The apparatus may include: a transceiver unit, configured to receive a second configuration message sent by a network control device, where the second configuration message is used by the network control device to configure a network device set for the user equipment, the network device set includes a first network device and a second network device, the first network device includes a first resource management entity, the second network device includes a second resource management entity, the first resource management entity and the second resource management entity are used to exchange resource management message with the user equipment, and the re source management message is used for radio resource management; and a processing unit, configured to establish a third resource management entity based on the second configuration message, where the third resource management entity is used to exchange, by the user equipment, the resource management messages with the first resource management entity and the second resource management entity. In this way, the user equipment can establish a control-plane connection to and exchange a resource management message with the first network device and/or the second network device by using the third resource management entity. In a multi-connectivity scenario, a plurality of network devices can establish a control-plane connection to and exchange resource management messages with the UE, and the network device is not limited to an MeNB, so that load existing in information exchange between network devices, for example, between the MeNB and another SeNB, can be reduced. The radio resource management apparatus provided in the fourth aspect of the present disclosure may further include more optional solutions. For details, refer to related descriptions of the radio resource management method provided in the second aspect of the present disclosure.

A sixth aspect of the present disclosure provides a radio resource management apparatus. The apparatus may be applied to a network device. The apparatus may include: a transceiver unit, configured to receive a first configuration message, where the first configuration message is used by a network control device to configure a network device set for user equipment, the network device set includes a first network device and a second network device, the first network device includes a first resource management entity, the second network device includes a second resource management entity, the first resource management entity and the second resource management entity are used to exchange resource management messages with the user equipment, and the resource management message is used for radio resource management; and a processing unit, configured to establish the second resource management entity based on the first configuration message, where the transceiver unit is further configured to exchange a resource management message with the user equipment by using the second resource management entity. By using the method in a multi-connectivity scenario, a plurality of network devices can establish a control-plane connection to and exchange resource management messages with the UE, and the network device is not limited to an MeNB, so that load existing in information exchange between network devices, for example, between the MeNB and another SeNB, can be reduced. The radio resource management apparatus provided in the sixth aspect of the present disclosure may further include more optional solutions. For details, refer to related descriptions of the radio resource management method provided in the third aspect of the present disclosure.

A seventh aspect of the present disclosure provides a network control device. The network control device includes a processor, a transceiver, a memory, and a bus. The memory is configured to store a program, the processor is connected to the memory by using the bus, and when the network control device runs, the processor executes the program stored in the memory, so that the network control device executes the radio resource management method in the first aspect of the present disclosure.

An eighth aspect of the present disclosure provides user equipment, including a memory, a transceiver, and a processor. The memory is configured to store a program, and when the user equipment runs, the one or more processors execute the program stored in the memory, so that the user equipment executes the radio resource management method in the second aspect of the present disclosure.

A ninth aspect of the present disclosure provides a computer readable storage medium storing one or more programs. The one or more programs include an instruction, and when the instruction is executed by a network control device including one or more processors, the network control device executes the radio resource management method in the first aspect of the present disclosure.

A tenth aspect of the present disclosure provides a computer readable storage medium storing one or more programs. The one or more programs include an instruction, and when the instruction is executed by user equipment including one or more processors, the user equipment executes the radio resource management method in the second aspect of the present disclosure.

It can be learned from the foregoing descriptions that, in some feasible implementations of the present disclosure, in the multi-connectivity scenario, the network control device may configure the network device set for the user equipment. The set at least includes the first network device and the second network device. A resource management entity corresponding to the user equipment is configured on each of the first network device and the second network device. The network control device further configures a resource management entity on the user equipment. In this way, the first network device and the second network device can establish a control-plane connection to and exchange resource management messages with the resource management entity on the user equipment by using their respective resource management entities, where the resource management message is used for radio resource control and management, and the first network device and the second network device can further exchange a resource management message with each other by using their respective resource management entities. For example, the first network device may be an MeNB, and the second network device may be an SeNB. In this case, configuration messages of a plurality of network devices do not need to be delivered to the user equipment by using one network device. Therefore, load existing in radio resource management information exchange between network devices can be reduced. For example, load existing in RRC message exchange between the MeNB and the SeNB can be reduced.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show only some embodiments of the present disclosure, and a person of ordinary skill n the art may still derive other drawings from these accompanying drawings without creative efforts.

DESCRIPTION OF EMBODIMENTS

To make a person skilled in the art understand the technical solutions in the present disclosure better, the following clearly describes the technical solutions in the embodiments of the present disclosure with reference to the accompanying drawings in the embodiments of the present disclosure. Apparently, the described embodiments are only some rather than all of the embodiments of the present disclosure. All other embodiments obtained by a person of ordinary skill in the art based on the embodiments of the present disclosure without creative efforts shall fall within the protection scope of the present disclosure.

In the specification, claims, and accompanying drawings of the present disclosure, the terms "first", "second", "third", and the like are intended to distinguish between different objects but do not indicate a particular order. In addition, the terms "include", "contain", or any other variant thereof are intended to cover a non-exclusive inclusion. For example, a process, a method, a system, a product, or a device that includes a series of steps or units is not limited to the listed steps or units, but optionally further includes an unlisted step or unit, or optionally further includes another step or unit that is inherent to the process, the method, the product, or the device.

As described in the background, to provide a relatively high system capacity for a hotspot region, micro cells are usually deployed in the hotspot region. In a scenario in which a large quantity of dense micro cells are deployed to provide coverage, UE needs to establish a connection to a plurality of eNBs. The eNB may be understood as an abbreviation of an evolved NodeB, or may be understood as an abbreviation of an evolved universal terrestrial radio access network NodeB (E-UTRAN NodeB).

Figure 1:
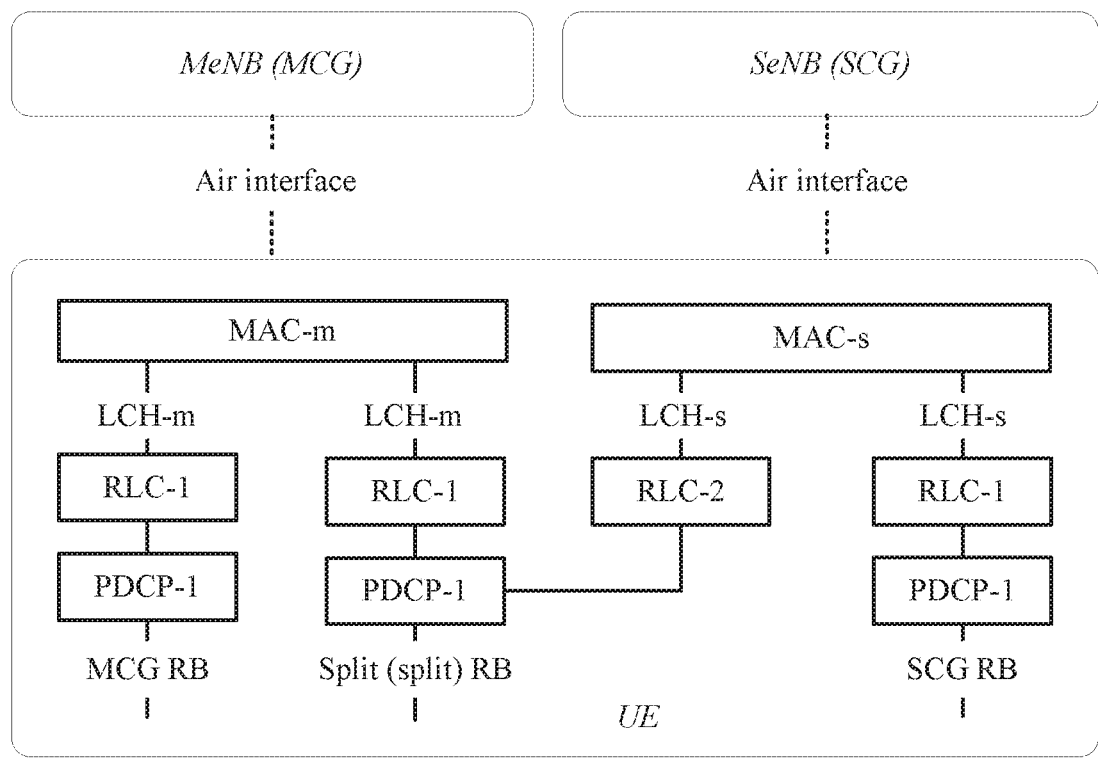
FIG. 1 is a schematic diagram of a dual-connectivity network structure.

With the development of wireless network technologies, a new network architecture, namely, dual connectivity (DC for short), is introduced. As shown in FIG. 1, in this network architecture, UE is corresponding to two eNBs, namely, the UE may receive data packets from both of the two eNBs, and may send data packets to the two eNBs. The received or sent data packets are carried on one or more radio bearers (Radio Bearer, RB for short).

In the DC network architecture, only one eNB can generate a radio resource control RRC message used for UE configuration, the eNB may be referred to as a master eNB (MeNB), and the other eNB may be referred to as a secondary eNB (SeNB). In the MeNB, a cell group including cells providing a service for UE is referred to as a master cell group (MCG), and in each SeNB, a cell group including cells providing a service for the UE is referred to as a secondary cell group (SCG). The network architecture in which the user equipment is corresponding to two eNBs has a plurality of advantages. For example, network mobility performance can be improved, and a throughput of the user equipment can be improved.

In the DC network architecture, the UE may support three types of RBs: an MCG RB, a split RB, and an SCG RB. Protocol entities and logical channels (LCH) in the UE that are associated with the three types of RBs are different. Details are as follows:

The MCG RB is associated with one Packet Data Convergence Protocol (PDCP) entity (PDCP-1), one Radio Link Control (RLC) entity (RLC-1), and one LCH (LCH-m), where m is an abbreviation of "master", and represents Media Access Control (MAC) of the MeNB or the MCG.

The split RB is associated with one PDCP entity (PDCP-1), two RLC entities (RLC-1 and RLC-2), and two LCHs (LCH-m and LCH-s), where s is an abbreviation of "secondary", and represents MAC of the SeNB or the SCG.

The SCG RB is associated with one PDCP entity (PDCP-1), one RLC entity (RLC-1), and one LCH (LCH-s).

The LCH-m is an LCH on MAC-m, and the LCH-s is an LCH on MAC-s. The MAC-m and the MAC-s are MAC entities respectively corresponding to the MeNB (MCG) and the SeNB (SCG).

As described above, in the DC network architecture, the UE is usually connected to two eNBs. However, in the scenario in which a large quantity dense micro cells are deployed to provide coverage, the UE needs to establish a connection to more eNBs. A network architecture in which the UE is connected to at least two eNBs and exchanges data packets with the at least two eNBs may be referred to as dual connectivity. The dual connectivity may be considered as a relatively simple of multi-connectivity, and the multi-connectivity may be considered as an extension of the dual connectivity.

The multi-connectivity may be used to improve a throughput, reduce a handover quantity, avoid a radio link failure and a handover failure that are caused by handover, reduce signaling load of a core network, and the like. In a multi-connectivity scenario, changes between eNBs and cells, for example, adding or deleting a secondary cell or a secondary cell group, or changing a master cell, become more frequent, and service resource management is more tedious and complex. During these operations, the MeNB and the SeNB need to exchange a large amount of control signaling, and consequently load existing in control signaling exchange between the MeNB and different SeNBs is increased.

In the foregoing technology, a plurality of eNBs establish a data-plane connection to the UE, but only the MeNB establishes a control-plane connection to the UE. In this case, only the MeNB can generate the radio resource RRC message used for UE configuration. Consequently, flexibility of extensible management and coordinated management on eNBs cannot be adapted to the multi-connectivity scenario, and a problem that the load existing in information exchange between the MeNB and the SeNB is increased cannot be resolved.

In the embodiments of this application, resource management message exchange between information elements may mean that the information elements establish a control-plane connection or perform control-plane interaction. Data exchange or data packet transmission between information elements may mean that the information elements establish a data-plane connection or perform data-plane interaction. The information element may be a network device (e.g., UE), a network control device, and the like.

To resolve the foregoing problem, the embodiments of the present disclosure provide a radio resource management method and a corresponding apparatus. The following separately provides detailed descriptions by using specific embodiments.

Figure 2:
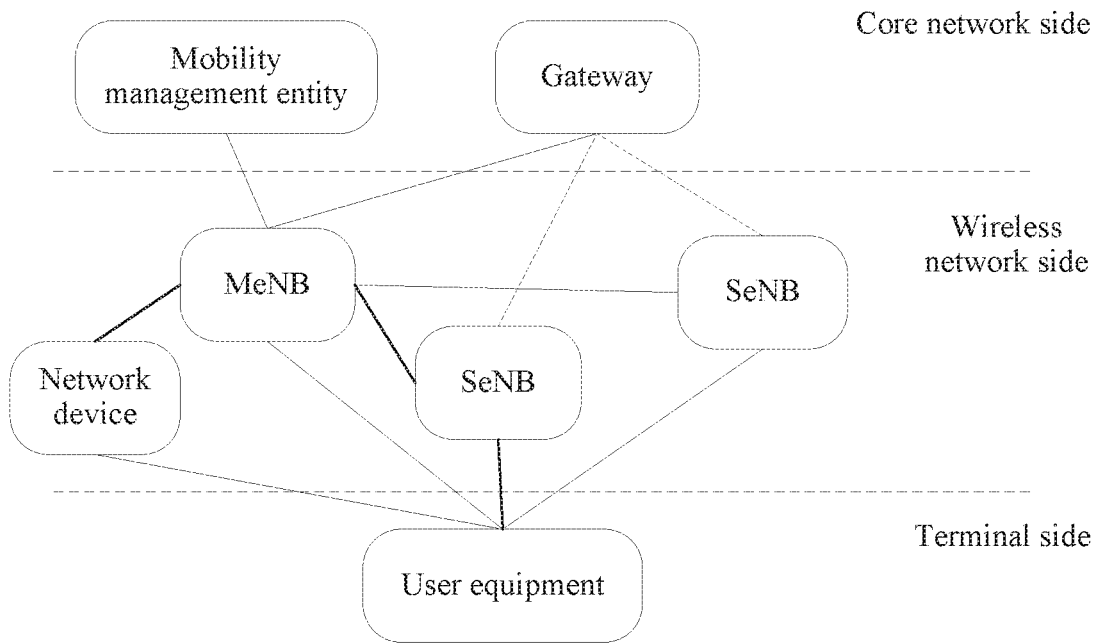
FIG. 2 is a schematic diagram of a multi-connectivity network structure according to an embodiment of the present disclosure.

Referring to FIG. 2, FIG. 2 is a schematic diagram of a multi-connectivity network structure according to an embodiment of the present disclosure. As shown in FIG. 2, UE is connected to a plurality of network devices. The network device is a device on a wireless network side, may be an eNB (eNB) such as a macro base station, a micro base station, a home eNodeB, or WiFi, or may be a device such as a relay device, a receiver node, or a transmitter node. In this specification, that the network device is an eNB is used as an example. The plurality of eNBs connected to the UE may include one MeNB and at least one SeNB. The UE is not only connected to the MeNB, but also connected to the at least one SeNB. The MeNB may be connected to a network device on which a mobility management entity (MME) and/or a gateway (GW) are/is deployed, the SeNB may be or may not be connected to a network device on which a GW is deployed, and the MeNB is connected to the SeNB. The GW may be specifically a serving gateway (S-GW).

The multi-connectivity network architecture shown in FIG. 2 is applicable to any one of the following wireless communications networks: a Universal Mobile Telecommunications System (UMTS), a Global System for Mobile Communications (GSM), Code Division Multiple Access (CDMA), a wireless Local area network (WLAN). Wireless Fidelity (Wifi), Long Term Evolution (LTE), a next generation network such as 5G (5-Generation), and the like.

The embodiments of the present disclosure are applicable to a scenario such as aggregation of a plurality of nodes in any one of the foregoing wireless communications networks or aggregation of a plurality of nodes from a plurality of wireless communications networks, and aggregation between different radio access standards of 5G. The node may be understood as the network device in this specification, and may be an eNB, a relay device, a receiver node, a transmitter node, or the like.

Figure 3:
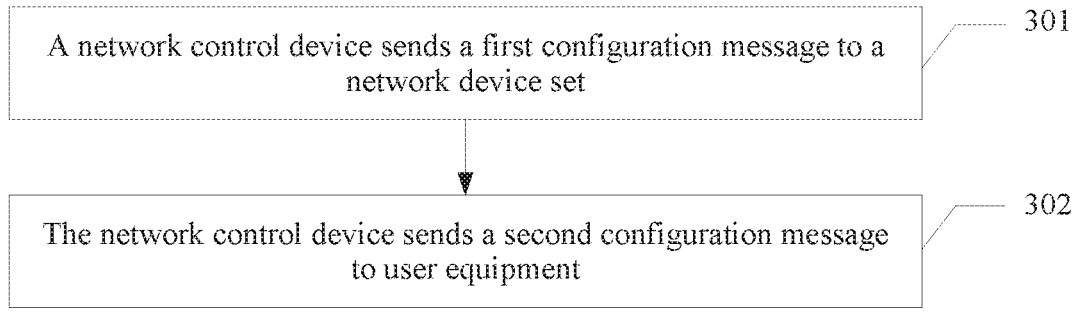
FIG. 3 is a schematic flowchart of a radio resource management method according to an embodiment of the present disclosure.

Referring to FIG. 3, an embodiment of the present disclosure provides a radio resource management method. The method may include the following steps:

301. A network control device sends a first configuration message to a network device set, where the first configuration message is used to configure the network device set for user equipment, the network device set includes a first network device and a second network device, the first network device includes a first radio resource management entity, the second network device includes a second resource management entity, the first resource management entity and the second resource management entity are used exchange resource management messages with the user equipment, and the resource management message is used for radio resource management.

The first resource management entity may be configured to configure the first network device, the second network device, and the user equipment, and the second resource management entity may be configured to configure the second network device and the user equipment. Optionally, the network device set further includes N secondary network devices, the second resource management entity may be configured to configure the second network device, the user equipment, and the N secondary network devices, and N is a positive integer.

302. The network control device sends a second configuration message to the user equipment, where the second configuration message is used to configure a third resource management entity on the user equipment, and the third resource management entity is used to exchange, by the user equipment, the resource management messages with the first resource management entity and the second resource management entity.

The first network device and the second network device each may be a network device such as an eNB, a relay device, a receiver node, or a transmitter node, or may be referred to as a node or a network node. The network control device may be a base station controller, or may be the first network device, namely, the first network device may also be used as the network control device.

That a network control device sends a first configuration message to a network device set may be: sending the first configuration message to all or some network devices in the network device set. When the network control device is the first network device, the step may be: sending the first configuration message to another network device that is different from the first network device in the network device set and that includes the second network device.

In this specification, a connection includes a data-plane connection and a control-plane connection. Some or all of a plurality of network devices in the network device set configured for the user equipment need to establish a data-plane connection to the user equipment to form a multi-connectivity network architecture, namely, that the network control device configures the network device set for the user equipment may include: configuring or instructing the plurality of network devices in the network device set to establish a data-plane connection to the user equipment.

In this specification, that the first resource management entity is used to configure the first network device, the second network device, and the user equipment may be understood as follows: The first resource management entity is used to configure MAC layers, RLC layers, and/or packet data convergence protocol (PDCP) layers for the first network device, the second network device, and the user equipment, and the first resource management entity is used to perform time-frequency resource scheduling and management for the first network device, the second network device, and the user equipment.

Similarly in this specification, that the second resource management entity is used to configure the second network device, the user equipment, and the N secondary network devices may be understood as follows: The second resource management entity is used to configure MAC, RLC, and/or PDCP for the second network device, the user equipment, and the N secondary network devices, and the second resource management entity is used to perform time-frequency resource scheduling and management for the second network device, the user equipment, and the N secondary network devices.

In addition, at least two network devices including the first network device and the second network device in the network device set need to establish a control-plane connection to the user equipment, to implement radio resource management on the user equipment.

In this specification, the network devices in the network device set may be classified as follows from a function perspective:

1. The first network device in the network device set is referred to as a master network device. The master network device may be configured to establish a control-plane connection to the user equipment, and configured to configure the user equipment and any network device in the network device set. When the master network device is an eNB, the master network device may also be referred to as a master eNB, and is represented by MeNB.

2. The second network device in the network device set is referred to as a master-secondary network device. The master-secondary network device may be configured to establish a control-plane connection to the user equipment, and configured to configure the user equipment and at least one network device including the secondary network device. When the master-secondary network device is an eNB, the master-secondary network device may also be referred to as a master-secondary eNB, and is represented by M (master)-SeNB.

3. A network device that is in the network device set, on which no resource management entity corresponding to the user equipment is established, and that can establish only a data-plane connection instead of a control-plane connection to the user equipment is referred to as a secondary network device. When the secondary network device is an eNB, the secondary network device may also be referred to as a secondary eNB, and is represented by SeNB.

It can be learned from the foregoing descriptions that, different from a DC technology, in this embodiment of the present disclosure, the network device set may further include an M-SeNB in addition to an MeNB and an SeNB. A difference between the M-SeNB and the MeNB lies in that the M-SeNB can configure only some network devices in the network device set. There may be one or more M-SeNBs.

In this specification, that the network device is an eNB is used as an example. Therefore, the MeNB in the following descriptions may be understood as a master network device which is not limited to a master eNB, the SeNB may be understood as a secondary network device which is not limited to a secondary eNB, and the M-SeNB may be understood as a master-secondary network device which is not limited to a master-secondary eNB.

In this specification, the resource management entity is a function entity configured to perform radio resource management. Optionally, the resource management entity may be an RRC entity, or may be a radio resource management (RRM) entity, and the control-plane connection may be specifically an RRC connection.

In this specification, the resource management message is used for radio resource management, and the message may be a control message, control signaling, or the like, for example, may be an RRC message.

However, it should be noted that, the RRC entity, the RRC connection, and the RRC message only examples in this specification, but are not used to limit the present disclosure. For ease of description and understanding, the following provides descriptions based on the examples.

Figure 4:
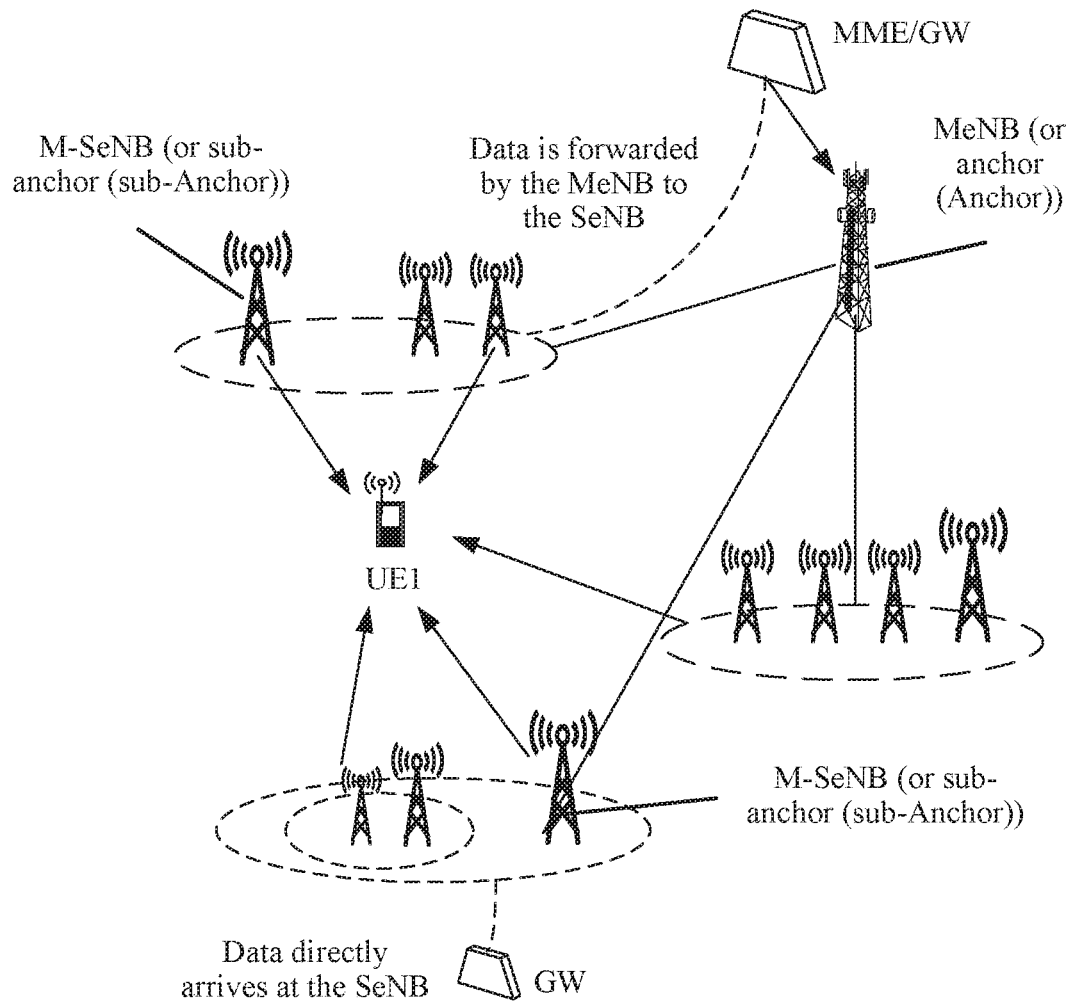
FIG. 4 is a schematic diagram of another multi-connectivity network structure according to an embodiment of the present disclosure.

Referring to a multi-connectivity network architecture shown in FIG. 4, in the method in this embodiment of the present disclosure, the network control device may configure the network device set for the UE. The network device set includes a plurality of network devices, and may specifically include one MeNB and at least one SeNB. The UE may be connected to the MeNB and the at least one SeNB, receive data packets from the plurality of network devices, and separately send, to the plurality of network devices, data packets that need to be sent.

A first RRC entity corresponding to the UE is configured on the MeNB. The MeNB on which the first RRC entity is configured is the first network device in this specification. The first network device may establish an RRC connection to the UE by using the first RRC entity, to exchange an RRC message. The MeNB may be configured to configure each network device in the network device set and configured to configure the UE.

An RRC entity is used to process a control-plane message between UE and an evolved NodeB (eNB). The RRC entity allocates a radio resource and sends related signaling. Control signaling between the UE and an access network or the network device is mainly an RRC message. The RRC message carries all parameters required for establishing, modifying, and releasing PDCP layer protocol entity, an RLC layer protocol entity, a MAC layer protocol entity, and a physical layer protocol entity. In a wireless communications interface, a physical layer is at a first layer, a PDCP layer, an RLC layer, and a MAC layer are at a second layer, and an RRC layer is at a third layer. In this specification, some functions of the RRC entity may be implemented by a radio resource management (RRM) entity.

Different from the DC technology in which only an MeNB can exchange an RRC message with UE, in this embodiment of the present disclosure, the network control device further selects one or more SeNBs, and instructs one selected SeNB to configure an RRC entity on the SeNB. The SeNB on which the RRC entity is configured may be represented by an M-SeNB. The M-SeNB may also establish an RRC connection to the UE by using the configured RRC entity, to exchange an RRC message. In addition, in this embodiment of the present disclosure, the RRC entity configured on the M-SeNB may be configured to configure a connection between the M-SeNB and the UE, and may further be configured to configure a connection between another SeNB and the UE, namely, the RRC entity configured on the M-SeNB may be shared by one or more SeNBs including the M-SeNB. A subset of the network device set includes the one or more SeNBs. The RRC entity in the subset may configure all network devices in the subset. It should be noted that, in this embodiment of the present disclosure, the network device set may include a plurality of such subsets, and each subset includes one M-SeNB on which an RRC entity is configured. The set may be explicitly or implicitly indicated to the UE by the network control device or the MeNB. In this specification, the second network device is an M-SeNB on which an RRC entity is configured, and the RRC entity configured on the second network device is referred to as a second RRC entity.

In some embodiments of the present disclosure, the network device set may further include N secondary network devices. The second resource management entity is used to configure the second network device, the user equipment, and the N secondary network devices, and N is a positive integer. In other words, a subset of the network device set includes the N secondary network devices and the second network device that share the second resource management entity. The subset is referred to as a first subset in this specification. All network devices in the first subset share the second resource management entity. The sharing means that a network device other than the second network device in the first subset generates RRC information, and sends the RRC information to the second network device, so that the second RRC entity on the second network device sends the RRC message. The first subset may be explicitly or implicitly indicated to the UE by the network control device or the MeNB. It should be understood that, the second network device may be any network device other than the first network device in the network device set. The first subset may be any subset of the network device set. In the following descriptions, description of the second network device are applicable to another network device, and descriptions of the first subset are applicable to another subset.

As described above, the first RRC entity corresponding to the UE is configured on the MeNB, and the MeNB may also be referred to as an anchor. At least one SeNB uses one second RRC/RRM entity, the at least one SeNB served by the second RRC/RRM entity may be used as the first subset, and the first subset may be explicitly or implicitly indicated to the UE. The second RRC entity is deployed on an M-SeNB in the first subset, is responsible for generating, reconfiguring, and delivering an RRC message related to the M-SeNB, and may further be responsible for generating, reconfiguring, and delivering PDCP layer control information, RLC layer control information, MAC layer control information, physical layer control information, and RRC layer control information that are related to another SeNB in the first subset. The M-SeNB on which the second RRC entity is located in the first subset may also be referred to as a sub-anchor. It should be noted that, the packet data convergence protocol (PDCP) layer may be configured to transmit a control-plane RRC message and a user-plane Internet Protocol (IP) data packet. If the SeNB in the first subset does not include a PDCP layer used to carry data, the RRC entity needs a PDCP entity configured to transmit RRC information, for example, a PDCP entity for transmitting signaling.

Figure 5:
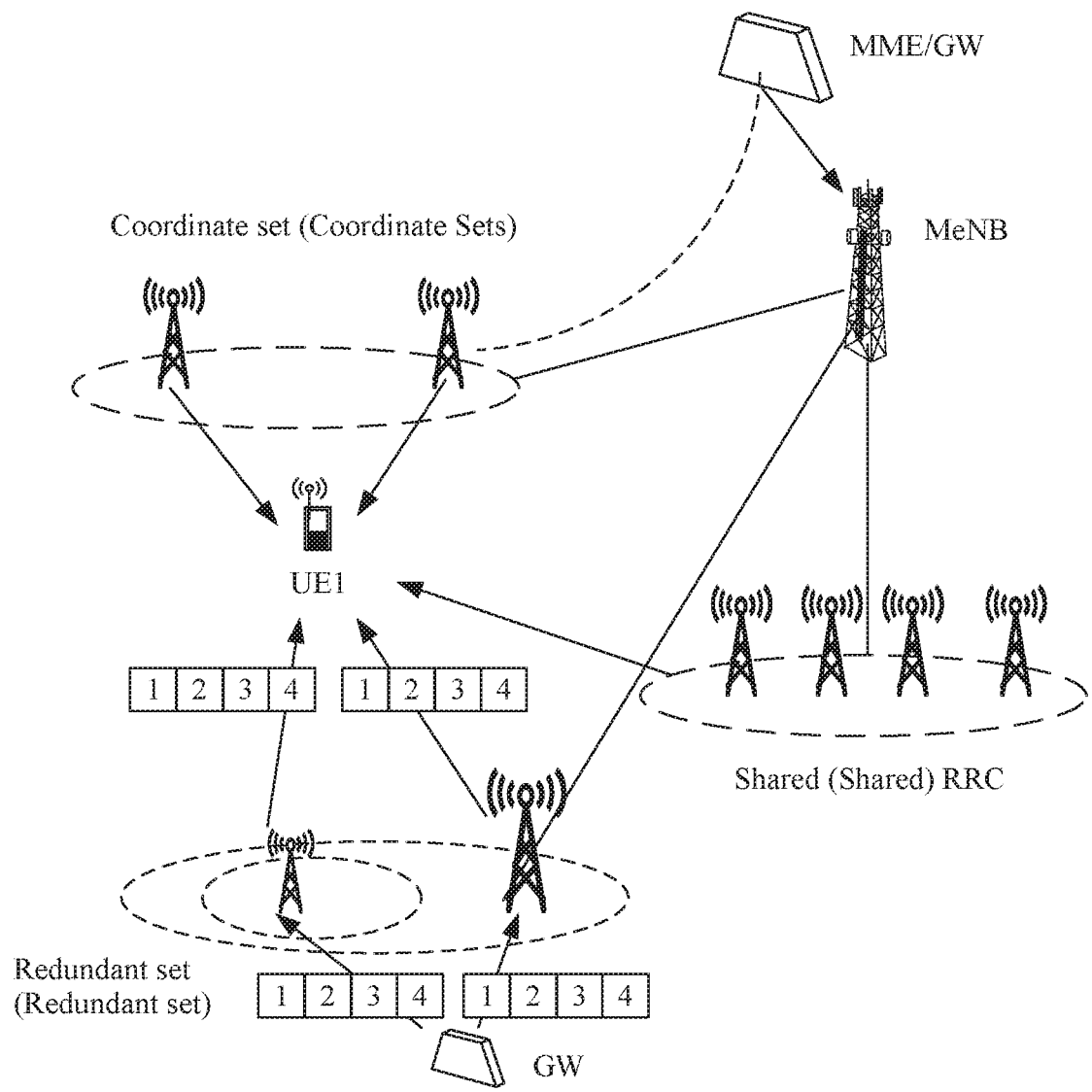
FIG. 5 is a schematic diagram still another multi-connectivity network structure according to an embodiment of the present disclosure.

Referring to a multi-connectivity network architecture shown in FIG. 5, optionally, the first subset may include several eNBs that are relatively close to each other, for example, eNBs in a timing advance (TA) group. Alternatively, the first subset may include several intra-frequency eNBs, and the several eNBs in the first subset share one RRC/RAM entity, and this facilitates resource scheduling and interference coordination. In this case, the first subset may be referred to as a coordinate set.

It should be noted that, when this embodiment of the present disclosure is applied to an LTE system, the MeNB is a termination point of an S1-MME connection, and whether the MeNB is a termination point of an S1-U connection depends on whether the MeNB is directly connected to a user-plane node in a core network, for example, a serving gateway (S-GW). An S1 interface is a communications interface between an LTE eNB and a packet core network (EPC), and divides the LTE system into a radio access network and a core network. The S1 interface inherits a bearer and control separation idea, and falls into two interfaces. One interface is an S1-MME interface used on a control plane, and the other interface is an S1-U interface used on a user plane. The user plane is also referred to as a data plane. The S1-MME interface is a control-plane interface from an MME to an eNB, and signaling for controlling the eNB by the MME terminates at the eNB. The S1-U interface is a user-plane interface from the S-GW to the eNB, and data sent by the S-GW to the eNB terminates at the eNB. The foregoing device names are names used in the LTE system, and the foregoing function descriptions may also be applied to a device having a similar function.

In this case, referring to FIG. 2, in some embodiments, that the network control device configures the network device set for the user equipment may further include the following steps: The network control device configures the first network device as a control-plane termination point between the first network device and a third network device, where the third network device includes a mobility management entity (MME); and when the first network device directly connected to a fourth network device, further configuring, by the network control device, the first network device as a data-plane termination point between the first network device and the fourth network device, where the fourth network device includes a serving gateway (S-GW). As shown in FIG. 2, the third network device and the fourth network device are devices on a core network side, and the first network device and the second network device are devices on a wireless network side.

In addition, for the second network device, the network control device may configure the second network device to establish a data-plane connection to a fourth network device, where the fourth network, device includes a serving gateway; or the network control device configures the second network device to establish a data-plane connection to the first network device.

When there is a data-plane connection between the second network device and the serving gateway, data of the serving gateway S-GW may directly arrive at the SeNB used as the second network device. When there is no data-plane connection between the second network device and the S-GW, but there is a data-plane connection between the second network device and the first network device, for example, the MeNB, data of the S-GW may be forwarded by the first network device to the SeNB used as the second network device.

It should be noted that, in this embodiment of the present disclosure, the network control device may be specifically a base station controller, or may be the first network device.

In some embodiments of the present disclosure, the first network device may be a network device that exchanges a resource management message with the user equipment before the network control device configures the network device set for the user equipment.

Optionally, before the network control device configures the network device set for the user equipment, the network control device may select a network device with best channel quality other than the first network device as the second network device based on a measurement report of the user equipment, and the network control device may instruct the second network device to establish the second resource management entity.

For example, assuming that an eNB1 is an eNB that initially establishes an RRC connection to the UE, the base station controller may configure the eNB1 as the first network device, and instruct the eNB1 to configure the UE to perform measurement and measurement report. Reported information obtained through measurement includes information about a plurality of eNBs or cells. The base station controller may select one eNB or an eNB of one cell, for example, an eNB2, from the plurality of eNBs or cells as the second network device. In this case, the base station controller may instruct the eNB1 to use, as the first RRC entity, an RRC entity that is initially established and is corresponding to the UE, instruct the eNB2 to establish the second RRC entity corresponding to the UE, and instruct at least network device including the eNB2 to share the second RRC entity. In this case, the first network device is used as a master network device (MeNB), and the second network device is used as a master-secondary network device (M-SeNB).

In some other embodiments of the present disclosure, the second network device may be a network device that exchanges a resource management message with the user equipment before the network control device configures the network device set for the user equipment.

Optionally, before the network control device configures the network device set for the user equipment, the network control device selects a network device with best channel quality other than the second network device as the first network device base on a measurement report of the user equipment, and the network control device instructs the first network device to establish the first resource management entity.

For example, assuming that an eNB3 is an eNB that initially establishes an RRC connection to the UE, the base station controller may configure the eNB3 as the second network device, and instruct the eNB3 to configure the UE to perform measurement and measurement report. Reported information obtained through measurement includes information about a plurality of eNBs. The base station controller may select one eNB, for example, an eNB1, from the plurality of eNBs as the first network device. In this case, the base station controller may instruct the eNB1 to establish the first RRC entity corresponding to the UE, instruct the eNB3 to establish the second RRC entity corresponding to the UE, and instruct at least one network device including the eNB3 to share the second RRC entity. The eNB3 may use, as the second RRC entity, an RRC entity that is initially established and is corresponding to the UE. In this case, the first network device is a master network device (MeNB), and the second network device is a master-secondary network device (M-SeNB).

In some embodiments of the present disclosure, when the network control device is the first network device, the first network device instructs the user equipment to perform measurement and measurement report, and the first network device selects, from a plurality of network devices based on a measurement report, a network device other than the first network device as the second network device. The first network device is a network device that initially establishes an RRC connection to the user equipment. The network control device uses, as the first RRC entity, an RRC entity that is initially established and is corresponding to the user equipment, instructs the second network device to establish the second RRC entity corresponding to the user equipment, and instructs at least one network device including the second network device to share the second RRC entity. The first network device is used as a master network device, and the second network device is used as a master-secondary network device. It should be noted that, the first network device and the second network device are network devices in the network device set configured for the user equipment.

For example, assuming that an eNB1 is an eNB that initially establishes an RRC connection to the UE, the eNB1 may configure the UE to perform measurement and measurement report. Reported information obtained through measurement includes information about a plurality eNBs or cells. The eNB1 may select one eNB or an eNB of one cell, for example, an eNB2, from the plurality of eNBs or cells as the second network device. In this case, the eNB1 may use, as the first RRC entity, an RRC entity that is initially established and is corresponding to the UE, instruct the eNB2 to establish the second RRC entity corresponding to the UE, and instruct at least network device including the eNB2 to share the second RRC entity. In this case, the first network device is a master network device (MeNB), and the second network device is a master-secondary network device (M-SeNB).

It should be noted that, the measurement report in the foregoing descriptions may include at least one of the following items: reference signal received power (RSRP), reference signal received quality (RSRQ), a signal to interference plus noise ratio (SINR), and a channel quality indicator (CQI).

After configuring the network device set for the user equipment in the foregoing manners, the network control device may send a configuration message about the configuration operation to the user equipment.

Figure 6:
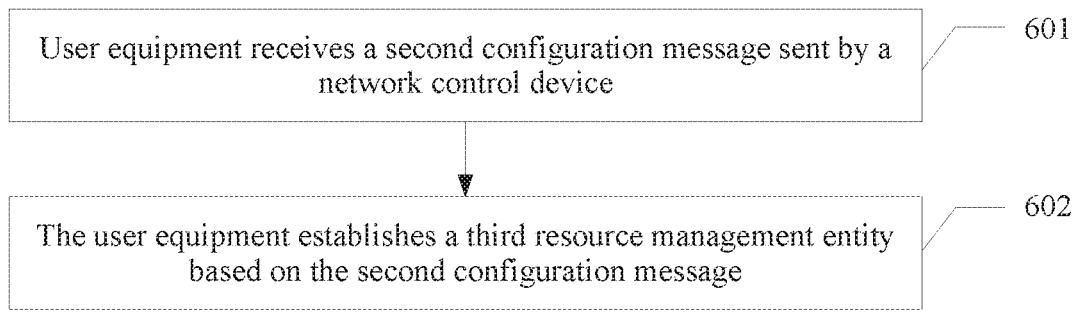
FIG. 6 is a schematic flowchart of another radio resource management method according to an embodiment of the present disclosure.

Referring to FIG. 6, an embodiment of the present disclosure further provides a radio resource management method, and the method is executed by user equipment and may include the following steps:

601. The user equipment receives a second configuration message sent by a network control device, where the second configuration message is used by the network control device to configure a network device set for the user equipment, the network device set includes a first network device and a second network device, the first network device includes a first resource management entity, the second network device includes a second resource management entity, the first resource management entity and the second resource management entity are used to exchange resource management messages with the user equipment, and the resource management message is used for radio resource management.

The first resource management entity may be configured to configure the first network device, the second network device, and the user equipment, and the second resource management entity may be configured to configure the second network device and the user equipment. Optionally, the network device set further includes N secondary network devices, the second resource management entity may be configured to configure the second network device, the user equipment, and the N secondary network devices, and N is a positive integer.

602. The user equipment establishes a third resource management entity based on the second configuration message, where the third resource management entity is used to exchange, by the user equipment, the resource management messages with the first resource management entity and the second resource management entity.

Specifically, the user equipment may establish a control-plane connection to the first network device and/or the second network device, and exchange resource management messages by using the control-plane connection.

The first resource management entity, the second resource management entity, and the third resource management entity may be specifically radio resource control RRC entities, the control-plane connection may be specifically an RRC connection, and the resource management message may be specifically an RRC message.

The user equipment establishes a third RRC entity based on the received second configuration message, to establish an RRC connection to the first network device and the second network device, and exchange an RRC message with the first network device and/or the second network device. A quantity of RRC entities established by the user equipment is not limited, and one or more entities may be established.

In some embodiments, the user equipment may establish at least two third resource management entities based on the second configuration message, and two of the at least two third resource management entities are respectively corresponding to the first resource management entity and the second resource management entity. The user equipment may concurrently exchange the resource management messages with the first resource management entity on the first network device and the second resource management entity on the second network device by using the at least two third resource management entities. When network devices on which resource management entities are configured are not limited to the first network device and the second network device, a quantity of resource management entities established by the user equipment may not be limited to two. Specifically, the UE may separately establish, based on the second configuration message, corresponding RRC entities corresponding to an MeNB and different subsets. In this case, the UE may concurrently send RRC messages to or receive RRC messages from the MeNB and M-SeNBs in the different subsets on a network side. In this way, because the M-SeNB is also responsible for receiving/sending some RRC messages, load existing in information exchange between the MeNB and an SeNB can be reduced.

In some other embodiments, the user equipment may establish only one third resource management entity based on the second configuration message. The third resource management entity is corresponding to both the first resource management entity and the second resource management entity. In this case, the user equipment may exchange the resource management messages with the first resource management entity on the first network device and the second resource management entity on the second network device in series by using the third resource management entity. Specifically, after receiving the second configuration message, the UE establishes only one RRC entity based on the second configuration message. In this case, the UE can send RRC messages to or receive RRC messages from an MeNB and M-SeNBs in different subsets on a network side only in series.

If the RRC message can be forwarded between network devices, the UE may add an indication to each of sent RRC messages, to indicate different destinations corresponding to the RRC messages; or the UE may allocate at least one corresponding specific logical channel such as a specific logical channel identifier to each or RRC messages having different destinations; or different signaling radio bearers (SRBs) may be defined for distinguishing. For example, SRBs whose destinations are an RRC entity in a subset-1 are referred to as SRBma, SRBmb, . . . ; SRBs whose destinations are an RRC entity in a subset-2 are referred to as SRBna, SRBnb, . . . ; and SRBs whose destinations are an RRC entity on an MeNB are referred to as SRBaa, SRBab, . . . .

In summary, in some embodiments, the user equipment sends, to the first network device or the second network device, a resource management message that carries information indicating a destination network device, so that the first network device or the second network device receiving the resource management message forwards the resource management message to the destination network device.

In some embodiments, the user equipment may pre-configure a plurality of logical channels, and a first logical channel and a second logical channel in the plurality of logical channels are respectively corresponding to the first network device and the second network device. The user equipment may send a resource management message to the first network device by using the first logical channel, and/or send a resource management message to the second network device by using the second logical channel.

It should be noted that, the UE may directly send an uplink RRC message to a second RRC entity on the second network device. However, the UE sends, to an MeNB or an SeNB, an RRC message related to non-access stratum (NAS), but needs to carry, in the message, an indication indicating that destination is the MeNB. Similar to the foregoing method, the UE may add an indication to the RRC message, to at least distinguish between different destinations; or the UE may allocate a specific channel such as a specific logical channel identifier to the RRC message; or different SRBs may be defined for distinguishing.

It should be noted that, the user equipment may further send a measurement report to the network control device. The measurement report dudes at least one of the following items: reference signal received power RSRP, reference signal received quality RSRQ, a signal to interference plus noise ratio SINR, and a channel quality indicator CQI. The measurement report may be used as a basis on which the network control device configures the network device set for the user equipment.

Figure 7:
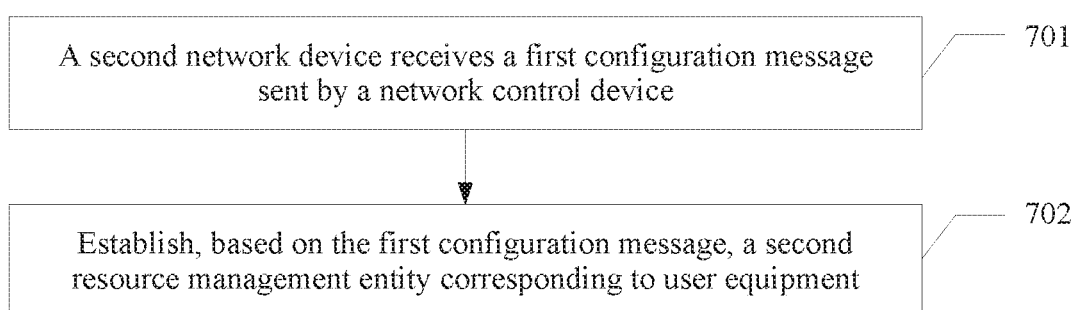
FIG. 7 is a schematic flowchart of still another radio resource management method according to an embodiment of the present disclosure.

Referring to FIG. 7, an embodiment of the present disclosure further provides a radio resource management method, and the method is executed by a network device and may include the following steps:

701. A second network device receives a first configuration message sent by a network control device, where the first configuration message is used the network control device to configure a network device set for user equipment, the network device set includes a first network device and the second network device, the first network device includes first resource management entity, the second network device includes a second resource management entity, the first resource management entity and the second resource management entity are used to exchange resource management messages with the user equipment, and the resource management message is used for radio resource management.

702. Establish, based on the first configuration message, the second resource management entity corresponding to the user equipment, where the second resource management entity is used to exchange, by the network device, the resource management message with the user equipment.

Optionally, the resource management entity is specifically an RRC en a control-plane connection is specifically an RRC connection, and the resource management message is specifically an RRC message.

Step 702 may specifically include: after establishing a control-plane connection to the user equipment by using the second resource management entity, receiving a resource management message sent the user equipment, determining whether a destination network device of the resource management message is the network device, and if no, forwarding the resource management message to the destination network device of the resource management message by using an X2 interface. The interface is an interface by which e-NodeBs are interconnected, and supports direct transmission of data and signaling.

Specifically, the second network device is an M-SeNB. After receiving an RRC message sent by the UE, the M-SeNB may perform determining based on an indication that is used to distinguish between destinations and that is carried in the RRC message; and if a destination is an RRC entity on the M-SeNB, the M-SeNB processes the RRC message; or if a destination is an RRC entity on an MeNB, the M-SeNB forwards the RRC message to the MeNB. A forwarding manner of X2 interface signaling may be used in a process in which the M-SeNB forwards the message to the MeNB.

In addition, the second network device may perform node management based on a measurement report reported by the UE. For example, when the second network device is a network device in a first subset, the second network device may perform an SeNB addition, deletion, and/or modification operation on the first subset, and perform a service offloading operation and/or a data packet offloading operation between nodes in the first subset, namely, a sub-anchor (the second network device) in the first subset may be responsible for node management in the first subset.

Optionally, when the SeNB addition, deletion, and/or modification operation is performed on the first subset, after a procedure of the service offloading operation and/or the data packet offloading operation between the nodes in the first subset ends, the network device may send a notification message to indicate the event to the MeNB. In addition, if the MeNB needs to perform updating, the MeNB may initiate an updating procedure or a reconfiguration procedure.

The foregoing describes main features of the technical solutions in the embodiments of the present disclosure from the perspectives of the network control device, the user equipment, and the network device with reference to FIG. 2 to FIG. 7. It can be learned from the foregoing descriptions that, in some feasible implementations of the present disclosure, in a multi-connectivity scenario, the network device set configured for the user equipment at least includes the first network device and the second network device. An RRC entity corresponding to the user equipment is configured on each of the first network device and the second network device, and the first network device and the second network device may exchange RRC messages with the user equipment by using their respective RRC entities. The first network device may be an MeNB, and the second network device may be an SeNB. In this case, configuration messages of a plurality of network devices do not need to be delivered to the user equipment by using one network device. In this way, load existing in information exchange between network devices, for example, between the MeNB and the SeNB, can be reduced.

It can be learned from the foregoing descriptions that, in the embodiments of the present disclosure, the network device set configured by the network control device for the user equipment may at least include one first network device and one first subset including the second network device. The first RRC entity on the first network device may be configured to configure all network devices in the network device set and the user equipment. The second RRC entity on the second network device may be configured to configure all network devices in the first subset and the user equipment. The user equipment establishes a data-plane connection to each network device in the network device set, and establishes a control-plane connection to each of the first network device and the second network device.

The user equipment may split, into a plurality of pieces of data, data that needs to be sent to the network side, and separately send the plurality of pieces of data to the plurality of network devices in the network device set, and the data is finally forwarded by the plurality of network devices to the serving gateway. In addition, the user equipment may receive data sent by the plurality of network devices, and combine the data from the plurality of network devices.

In some embodiments of the present disclosure, to ensure reliability of data transmission a second subset may further be configured for the user equipment. A network device in the second subset is configured to transmit same data as that transmitted by some or all network devices in the first subset. As redundancy the first subset, the second subset may further be referred to as a redundant set. A redundant set configuration procedure may include the following step:

S1. An MeNB or an M-SeNB instructs a network device such as an eNB4 to join in a redundant set, where the redundant set may be a redundant set of the foregoing first subset, and is used to be responsible for data transmission together with the first subset; and instructs the UE and the eNB4 to establish a connection, where the establishing a connection herein means establishing a data-plane connection. Optionally, the network control device such as a base station controller may control the MeNB or the M-SeNB to instruct the eNB4 to join in the redundant set.

S2. After receiving the instruction from the MeNB or the M-SeNB and access information of the UE, the eNB4 request a serving gateway S-GW to establish a data-plane connection to the eNB4.

S3. After establishing a data-plane connection to the eNB4, the S-GW sends data to both the eNB4 and another eNB in the first subset. The data sent to the eNB4 and data sent to an eNB such as an eNB1 in the first subset may be the same, namely, the eNB4 is used as a redundant device of the eNB1.

S4. In this case, the UE separately receives data from another eNB such as an SeNB1 in the first subset and from the eNB4, and performs combination and repetition detection at a PDCP layer or an RLC layer. Cells or nodes in the redundant set may perform encryption, decryption, integrity protection, or de-integrity protection on data/signaling by using their respective independent security parameters or by using a same security parameter.

S5. If wireless condition of a cell in the first subset becomes poor, or the UE moves to a middle region of the cell, or a service reliability requirement of the UE is lowered, the MeNB may select a cell/node having poor signal quality or heavy load, and delete the cell/node from the set, but use a corresponding cell/node in the redundant set to transmit same data as that transmitted by the deleted cell/node, to ensure data transmission continuity and ensure that no service interruption occurs, or transfer, to another SeNB in the first subset, data to be transmitted by the deleted well or the removed eNB.

It can be learned that, the UE may use an eNB or a cell in the redundant cell to send/receive a same bearer, service, and/or data packet as that sent/received by an eNB or a cell in the first subset. Optionally, the cell in the redundant set may be from the MeNB and the SeNB, or may be only an SCG from an SeNB set. Transmitting data by using both the first subset and the redundant set of the first subset may ensure transmission reliability and a transmission rate on a cell edge and ensure that user-plane data transmission is not interrupted in a cell addition or deletion process. A reason is as follows: The cell in the redundant set sends/receives a same bearer/service/data as that sent/received by the eNB or the cell in the first subset, and if a cell change occurs in the coordinate cell, and data transmission is interrupted in the change process, the cell in the redundant set may provide data transmission.

It should be noted that, the redundant set may have no shared RRC/RRM entity, and the MeNB provides an RRC service for the eNB in the redundant set. To be specific, the redundant set may include a plurality of eNBs or a plurality of cells, but the redundant set may have no RRC entity corresponding to the UE, and each eNB in the redundant set send a configuration message by using an RRC entity on the MeNB. Certainly, an RRC entity serving the redundant set may be configured on a network device in the redundant set. This is not limited in this specification.

In the multi-connectivity structure shown in FIG. 5, a set including a plurality of network devices includes a coordinate set used as the first subset and a redundant set used as the second subset.

In the embodiments of the present disclosure, a redundant set is configured for the UE, so that service interruption caused when a user-plane connection is disconnected before being established in a handover process or a secondary eNB addition or deletion process can be avoided.

In addition, when the network control device or the first network device configures a redundant set for the user equipment, at least one of the following triggering conditions may be considered:

1. The redundant set is configured when the first subset is configured;
2. the redundant set is configured after the first subset is configured;
3. after channel quality fed back by the user equipment is received, it is determined, based on the channel quality (for example, when the channel quality is lower than a threshold), to configure the redundant set, where the channel quality is channel quality obtained when one or more network devices serving the user equipment serve the user equipment, and may include RSRP/RSRQ/SINR, a CQI, or the like;
4. the redundant set is configured when new service data of the user equipment is generated;
5. the redundant set is configured after the user equipment completes configuration for the MeNB/M-SeNB/SeNB;
6. the redundant set is configured before the network control device or the first network device sends an SeNB addition or deletion command or an SeNB switching command to the user equipment; and
7. the redundant set is configured when the network control device or the first network device detects that the user equipment is out of synchronization.

Under the foregoing triggering conditions, the network control device or the first network device may configure the user equipment to establish a connection to a cell or a node in the redundant set, and perform data transmission with the cell or the node in the redundant set.

Alternatively, under the foregoing triggering conditions, the network control device or the first network device may configure the user equipment to establish a connection to a cell or a node in the redundant set, but not to perform data transmission with the cell or the node in the redundant set. The cell or the node included in the redundant set may be in an active state or an inactive state relative to first user equipment. A set including a network device in an active state may be referred to as an active set, and a set including a network device in an inactive state may be referred to as an inactive set. When one or more cells or nodes in the redundant set are in an active state relative to the first user equipment, the one or more cells or nodes may provide data transmission for the first user equipment. When one or more cells or nodes in the redundant set are in an inactive state relative to the first user equipment, the one or more cells or nodes do not provide data transmission for the first user equipment. When the network control device or the first network device sends activation indication information to one or more cells or nodes in the redundant set and the first user equipment, the one or more cells or nodes start to provide data transmission for the first user equipment.

A condition of triggering sending of the activation indication information may include at least one of the following conditions:

1. The information is sent before the network control device or the first network device sends an SeNB addition or deletion command or an SeNB switching command to the user equipment;
2. the information is sent when the network control device or the first network device sends an SeNB addition or deletion command or an SeNB switching command to the user equipment;
3. after channel qualified back by the user equipment is received, it is determined, based on the channel quality (for example, when the channel quality is lower than a threshold), to activate one or more cells or nodes n the redundant set, where the channel quality is channel quality obtained when one or more network devices serving the user equipment serve the user equipment, and may include RSRP/RSRQ/SINR, a CQI, or the like;
4. the information is sent before the network control device or the first network device determines to re-key/refresh a key SeNB of the MeNB/M-SeNB/SeNB;
5. the information is sent when new service data of the user equipment is generated;
6. the information is sent when the user equipment needs to be handed over; and
7. the information is sent when the network control device or the first network device detects that the user equipment is out of synchronization.

A condition of triggering de-activation may include at least one of the following conditions:

1. The network control device or the first network device has completed an SeNB addition or deletion process or an SeNB switching process;
2. after channel quality fed back by the user equipment is received, it is determined, based on the channel quality (for example, when the channel quality is higher than a threshold), to de-activate one or more cells or nodes in the redundant set, where the channel quality is channel quality obtained when one or more network devices serving the user equipment serve the user equipment, and may include RSRP/RSRQ/SINR, a CQI, or the like; and
3. the MeNB/M-SeNB/SeNB has completed a key re-keying/refreshing process.

A condition of triggering deletion or modification on the redundant set may include at least one of the following conditions:

1. The M-SeNB/SeNB configured by the network control device or the first network device for the user equipment changes; and
2. after channel quality fed back by the user equipment is received, it is determined, based on the channel quality (for example, when the channel quality is higher/lower than a threshold), to add a network device to or delete a network device from the redundant set, where the channel quality is channel quality that is monitored by the user equipment and that is of one or more network devices in the redundant set configured for the user equipment, and may include RSRP/RSRQ/SINR, a CQI, or the like.

In addition, the network control device or the first network device may perform an activation configuration operation or a de-activation configuration operation on the first subset.

In addition, based on a feature of the redundant set, it is worthwhile describing a key refreshing and/or key re-keying process of each network device such as each eNB in the redundant set.

In the redundant set, only one or some cells or nodes may perform a key refreshing and/or key re-keying operation, and the other cells or nodes continue to send and/or receive data. The node may be understood as a network device such as an eNB in the redundant set.

a2. After the key refreshing and/or key re-keying operation ends, the other cells or nodes perform encryption, decryption, integrity protection, de-integrity protection on data/signaling by using a new key. Alternatively, the other cells or nodes perform a key refreshing and/or key re-keying operation. In this case, a cell or a node that has completed key refreshing and/or key re-keying sends and/or receives data.

In this process, a cell or a node performing the operation may obtain required next hop (NH) information or next hop chaining counter (NCC) information from MeNB. The cells or the nodes in the redundant set may use their respective independent security parameters, or a same security parameter.

The foregoing describes configuration of the second subset, namely, the redundant set. It should be noted that, in this embodiment of the present disclosure, the network control device may further configure one or more of the following sets for the UE. The following sets may be subsets of the network device set, and specifically include:

Monitored node set: The network control device or the first network device instructs the UE to monitor a cell in the set, for example, perform RRM measurement. However, the UE may not receive signals from all cells in the set.

Detectable set: The detectable set is a subset of the monitored node set, and is determined based on reporting of the UE. The UE may report, to the network control device or the first network device, a detectable set determined based on latest measurement information. Alternatively, the detectable set is maintained by the network control device or the first network device based on a measurement result reported by the UE, and is transparent to the UE. The network control device or the first network device selects a cell and/or a node from the detectable set, and uses the cell and/or the node as a cell and/or a node in a configuration set.

Configuration set: The configuration set is a set, of cells, configured the network control device or the first network device for the UE, and the UE establishes a connection to the cells. The configuration set may include an active set and an inactive set.

Active set: The active set includes a cell that can be scheduled by the network control device or the first network device, and the UE performs real-time signaling monitoring on the cell.

Inactive set: The inactive set includes a cell that the network control device or the first network device does not schedule temporarily, and the UE may not perform real-time signaling monitoring on the cell.

Coordinate set: The coordinate set includes several intra-frequency eNBs that share one RRC/RRM entity, and this facilitates resource scheduling and interference coordination. For example, the foregoing first subset may be a coordinate set.

After configuring one or more of the foregoing sets for the UE, the network control device or the first network device delivers a corresponding configuration message to the UE. After receiving the configuration message, the UE may perform a corresponding operation on a cell or a node in a different set. For example, the UE monitors the cell in the monitored node set, for example, performs RRM measurement, and processes and reports a measurement result based on measurement control information configured by the network control device or the first network device. The UE may report, to the network control device or the first network device, the detectable set determined based on the latest measurement information. Alternatively, the detectable set is maintained by the network control device or the first network device based on the measurement result reported by the UE, and is transparent to the UE. The UE establishes a connection to the cell in the configuration set. The establishing a connection may be establishing a user-plane and/or RRC connection. The configuration set may include the active set and the inactive set. The UE performs real-time signaling monitoring on the cell in the active set, and the UE may not perform signaling monitoring on the cell in the inactive set.

It should be noted that, in the embodiments of the present disclosure, all sets configured for the UE may be explicitly or implicitly indicated to the UE by the network control device or the first network device.

It can be learned from the foregoing descriptions that, in some feasible implementations of the present disclosure, a radio resource management method is provided. After the method is used, a plurality of network devices may establish a control plane connection to UE in a multi-connectivity scenario, to exchange resource management messages, and the network device is not limited to an MeNB, so that load existing in information exchange between the MeNB and another SeNB can be reduced.

To better implement the foregoing solutions of the embodiments of the present disclosure, the following further provides a related apparatus configured to implement the foregoing solutions.

Figure 8:
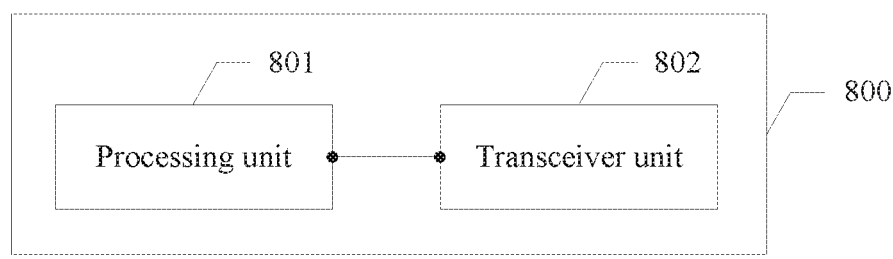
FIG. 8 is a schematic structural diagram of a radio resource management apparatus according to an embodiment of the present disclosure.

Referring to FIG. 8, an embodiment of the present disclosure provides a radio resource management apparatus 800. The apparatus 800 may include a processing unit 801 and a transceiver unit 802.

The processing unit 801 configured to generate a first configuration message based on user equipment and a network device set, where the first configuration message is used to configure the network device set for the user equipment, the network device set includes a first network device and a second network device, the first network device includes a first resource management entity, the second network device includes a second resource management entity, the first resource management entity and the second resource management entity are used to exchange resource management messages with the user equipment, and the resource management message is used for radio resource management.

The first resource management entity may be configured to configure the first network device, the second network device, and the user equipment, and the second resource management entity used to configure the second network device and the user equipment. Optionally, the network device set further includes N secondary network devices, the second resource management entity is used to configure the second network device, the user equipment, and the N secondary network devices, and N is a positive integer.

The processing unit 801 is further configured to generate a second configuration message for the user equipment, where the second configuration message is used to configure a third resource management entity on the user equipment, and the third resource management entity is used to exchange, by the user equipment, the resource management messages with the first resource management entity and the second resource management entity.

The transceiver unit 802 is configured to: send the first configuration message to the network device set, and send the second configuration message to the user equipment.

In some embodiments of the present disclosure, the first network device is a network device that exchanges a resource management message with the user equipment before the network control device configures the network device set for the user equipment.

In some embodiments of the present disclosure, the processing unit 801 is further configured to select a network device with best channel quality other than the first network device as the second network device based on a measurement report of the user equipment; and the transceiver unit 802 is further configured to instruct the second network device to establish the second resource management entity.

In some embodiments of the present disclosure, the network control device is the first network device, and the transceiver unit 802 is specifically configured to send the first configuration message to the second network device in the network device set.

In some embodiments of the present disclosure, the second network device a network device that exchanges a resource management message with the user equipment before the network control device configures the network device set for the user equipment.

In some embodiments of the present disclosure, the processing unit 801 is further configured to select a network device with best channel quality other than the second network device as the first network device based on a measurement report of the user equipment; and the transceiver unit 802 is further configured to instruct the first network device to establish the first resource management entity.

In some embodiments of the present disclosure, the measurement report includes at least one of the following items: reference signal received power (RSRP), reference signal received quality (RSRQ), a signal to interference plus noise ratio (SINR), and a channel quality indicator (CQI).

The radio resource management apparatus in this embodiment of the present disclosure may be applied to the foregoing network control device. The network control device may be, for example, an eNB or a base station controller.

The processing unit 801 and the transceiver unit 802 may be respectively corresponding to the processor and the transceiver of the network control device.

It may be understood that, functions of the function modules of the radio resource management apparatus this embodiment of the present disclosure may specifically implemented based on the method in the foregoing method embodiment. For a specific implementation process thereof, refer to related descriptions in the method embodiment, and details are not described herein again.

It can be learned from the foregoing descriptions that, in some feasible implementations of the present disclosure, a radio resource management apparatus is provided, and the apparatus is applied to a network control device. After the apparatus is used, a plurality of network devices may be configured to exchange resource management messages with UE in a multi-connectivity scenario, and the network device not limited to an MeNB, so that load existing in information exchange between the MeNB and another SeNB can be reduced.

Figure 9:
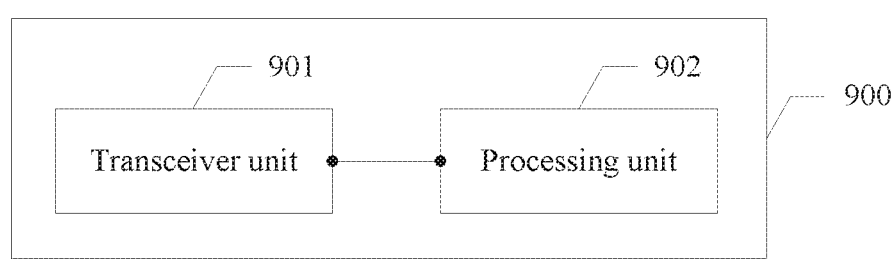
FIG. 9 is a schematic structural diagram of another radio resource management apparatus according to an embodiment of the present disclosure.

Referring to FIG. 9, an embodiment of the present disclosure provides a radio resource management apparatus 900. The apparatus 900 may include a transceiver unit 901 and a processing unit 902.

The transceiver unit 901 is configured to receive a second configuration message sent by a network control device, where the second configuration message instructs the network control device to configure a network device set for the user equipment, the network device set includes a first network device and a second network device, the first network device includes a first resource management entity, the second network device includes a second resource management entity, the first resource management entity and the second resource management entity are used to exchange resource management messages with the user equipment, and the resource management message is used for radio resource management.

The first resource management entity may be configured to configure the first network device, the second network device, and the user equipment, and the second resource management entity may be configured to configure the second network device and the user equipment. Optionally, the network device set further includes N secondary network devices, the second resource management entity is used to configure the second network device, the user equipment, and the N secondary network devices, and N is a positive integer.

The processing unit 902 is configured to establish a third resource management entity based on the second configuration message, where the third resource management entity is used to exchange, by the user equipment, the resource management messages with the first resource management entity and the second resource management entity.

In some embodiments of the present disclosure, the processing unit 902 is specifically configured to establish at least two third resource management entities based on the second configuration message, where two of the at least two third resource management entities are respectively corresponding to the first resource management entity and the second resource management entity; and the transceiver unit 901 is further configured to concurrently exchange the resource management messages with the first resource management entity and the second resource management entity by using the at least two third resource management entities.

In some embodiments of the present disclosure, the processing unit 902 is specifically configured to establish the third resource management entity based on the second configuration message, where the third resource management entity is corresponding to both the first resource management entity and the second resource management entity; and the transceiver unit 901 is further configured to exchange the resource management messages with the first resource management entity and the second resource management entity in series by using the third resource management entity.

In some embodiments of the present disclosure, the transceiver unit 901 is further configured to send, to the first network device or the second network device, a resource management message that carries information indicating a destination network device, so that the first network device or the second network device that receives the resource management message forwards the resource management message to the destination network device.

In some embodiments of the present disclosure, the processing unit 902 is further configured to preconfigure a plurality of logical channels, where a first logical channel and a second logical channel in the plurality of logical channels are respectively corresponding to the first network device and the second network device; and the transceiver unit 901 is further configured to: send a resource management message to the first network device by using the first logical channel, and/or send a resource management message to the second network device by using the second logical channel.

In some embodiments of the present disclosure, the transceiver unit 901 is further configured to send a measurement report to the network control device, where the measurement report includes at least one of the following items: reference signal received power (RSRP), reference signal received quality (RSRQ), a signal to interference plus noise ratio (SINR) and a channel quality indicator (CQI).

The radio resource management apparatus in this embodiment of the present disclosure may be applied to the foregoing user equipment, for example, a mobile phone. The transceiver module 901 may be corresponding to the transceiver of the user equipment, and the processing unit 902 may be corresponding to the processor of the user equipment.

It may be understood that, functions of the function modules of the radio resource management apparatus in this embodiment of the present disclosure may be specifically implemented based on the method in the foregoing method embodiment. For a specific implementation process thereof, refer to related descriptions in the method embodiment, and details are not described herein again.

It can be learned from the foregoing descriptions that, in some feasible implementations of the present disclosure, a radio resource management apparatus is provided, and the apparatus is applied to user equipment. After the apparatus is used, the user equipment may exchange resource management messages with a plurality of network devices in a multi-connectivity scenario, and the network device is not limited to an MeNB, so that load existing in information exchange between the MeNB and another SeNB can be reduced.

Figure 10:
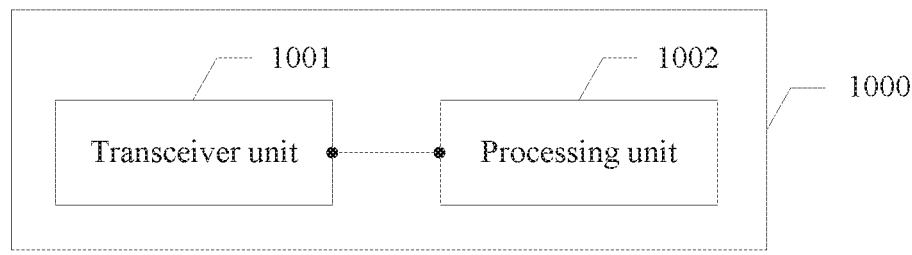
FIG. 10 is a schematic structural diagram of still another radio resource management apparatus according to an embodiment of the present disclosure.

Referring to FIG. 10, an embodiment of the present disclosure provides a radio resource management apparatus 1000. The apparatus 1000 may include:

a transceiver unit 1001, configured to receive a first configuration message sent by a network control device, where the first configuration message is used by the network control device to configure a network device set for user equipment, the network device set includes a first network device and a second network device, the first network device includes a first resource management entity, the second network device includes a second resource management entity, the first resource management entity and the second resource management entity are used to exchange resource management messages with the user equipment, and the resource management message is used for radio resource management; and a processing unit 1002, configured to establish the second resource management entity based on the first configuration message, where the transceiver unit 100 is further configured to exchange a resource management message with the user equipment by using the second resource management entity.

In some embodiments of the present disclosure, the resource management entity is specifically an RRC entity, a control-plane connection is specifically an RRC connection, and the resource management message is specifically an RRC message.

In some embodiments of the present disclosure, the transceiver unit 1001 may be specifically configured to: after a control-plane connection is established to the user equipment by using the second resource management entity, receive a resource management message sent by the user equipment, determine whether a destination network device of the resource management message is the network device, and f no, forward the resource management message to the destination network device of the resource management message by using an X2 interface.

The radio resource management apparatus in this embodiment of the present disclosure may be applied to the foregoing second network device, for example, an eNB. The transceiver unit 1001 may be corresponding to the transceiver of the second network device, and the processing unit 1002 may be corresponding to the processor of the second network device.

It may be understood that, functions of the function modules of the radio resource management apparatus in this embodiment of the present disclosure may be specifically implemented based on the method in the foregoing method embodiment. For a specific implementation process thereof, refer to related descriptions in the method embodiment, and details are not described herein again.

It can be learned from the foregoing descriptions that, in some feasible implementations of the present disclosure, a radio resource management apparatus is provided, and the apparatus is applied to a network device. After the apparatus is used, a plurality of network devices may exchange resource management messages with user equipment in a multi-connectivity scenario, and the network device is not limited to an MeNB, so that load existing in information exchange between the MeNB and another SeNB can be reduced.

Figure 11:
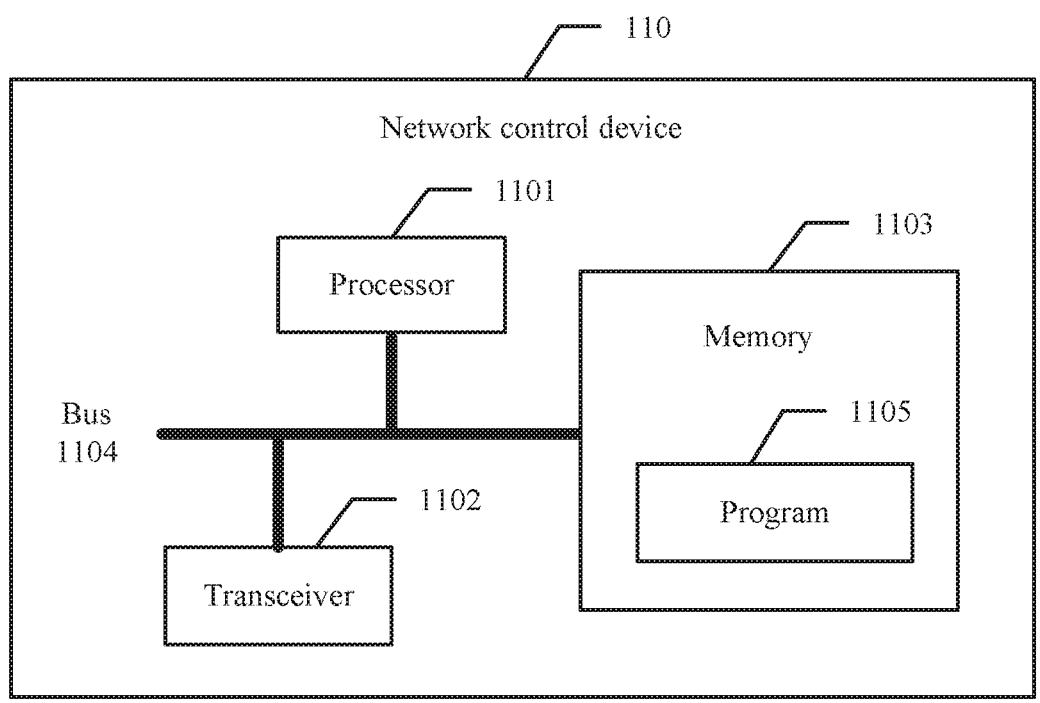
FIG. 11 is a schematic structural diagram of a network device according to an embodiment of the present disclosure.

Referring to FIG. 11, an embodiment of the present disclosure further provides a network control device 110. The network control device 110 may include:

a processor 1101, a transceiver 1102, a memory 1103, and a bus 1104.

The memory 1101 is configured to store a program 1105. The processor 1104 is connected to the memory 1103 by using the bus 1104. When the network control device 110 runs, the processor 1101 executes the program stored in the memory 1103, so that the network control device 110 executes the radio resource management method in the embodiment in FIG. 3.

The network control device 110 maybe specifically an eNB or a base station controller.

The bus 1104 may be an industry standard architecture (ISA) bus, a peripheral component interconnect (PCI) bus, an extended industry standard architecture (EISA) bus, or the like. The bus may fall into one or more of an address bus, a data bus, or a control bus. For ease of denotation, the bus is indicated by using only one thick line in the figure, but it does not indicate that there is only one bus or one type of bus.

The memory 1103 may include a high speed random access memory (RAM). Optionally, the memory 1606 may further include a non-volatile memory. For example, the memory 1103 may include a magnetic disk memory.

The processor 1101 may be a central processing unit (CPU), or the processor 1101 may be an application-specific integrated circuit (ASIC), or the processor 1101 may be one or more integrated circuits configured to implement this embodiment of the present disclosure.

It can be learned from the foregoing descriptions that, in some feasible implementations of the present disclosure, a network device is provided. The network control device is corresponding to the radio resource management apparatus in the embodiment FIG. 8, and may execute the radio resource management method in the embodiment in FIG. 3, and achieve technical effects that can be achieved in he method in the embodiment in FIG. 3. For example, the processor 1101 may perform the actions of the processing unit 801 in FIG. 8, and the transceiver 1102 may perform the actions of the transceiver unit 802 in FIG. 8.

Figure 12:
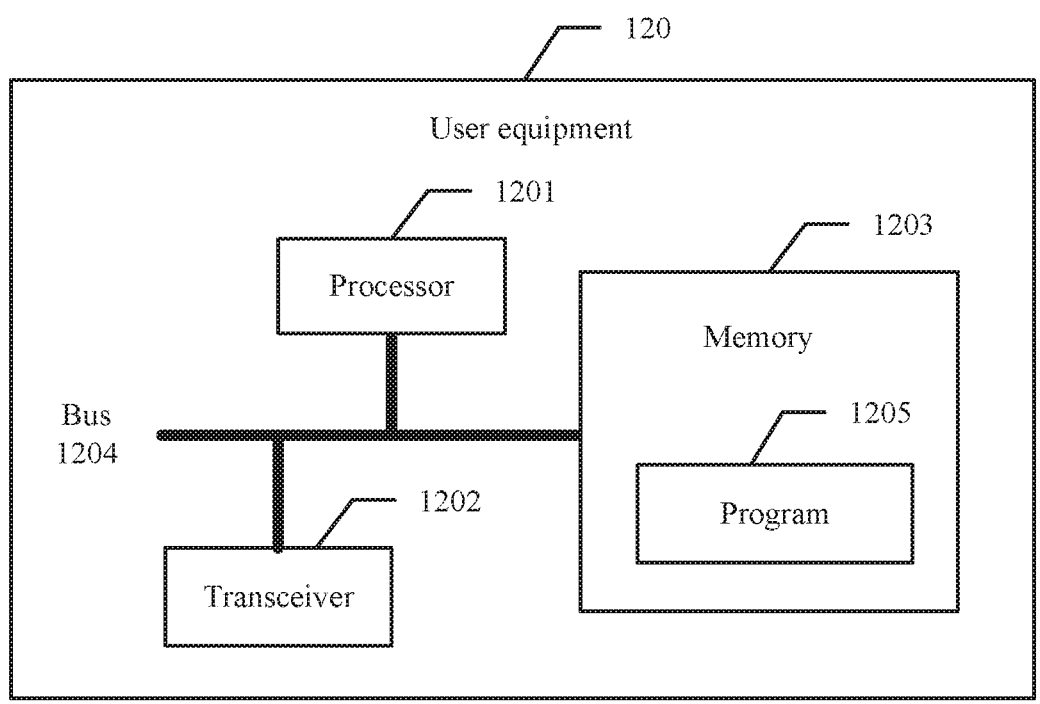
FIG. 12 is a schematic structural diagram of user equipment according to an embodiment of the present disclosure.

Referring to FIG. 12, an embodiment of the present disclosure further provides user equipment 120. The user equipment 120 may include:

a processor 1201, a transceiver 1202, a memory 1203, and a bus 1204.

The memory 1201 configured to store a program 1205. The processor 1204 is connected to the memory 1203 by using the bus 1204. When the user equipment 120 runs, the processor 1201 executes the program stored in the memory 1203, so that the user equipment 120 executes the radio resource management method in the embodiment in FIG. 6.

The user equipment 120 may be specifically a mobile phone, tablet computer, a notebook computer, a wearable device, or the like.

The bus 1204 may be an industry standard architecture (ISA) bus, a peripheral component interconnect (PCI) bus, an extended. industry standard architecture (EISA) bus, or the like. The bus may fall into one or more of an address bus, a data bus, or a control bus. For ease of denotation, the bus is indicated by using only one thick line in the figure, but it does not indicate that there is only one bus or one type of bus.

The memory 1203 may include a high speed random access memory (RAM). Optionally, the memory 1606 may further include a non-volatile memory. For example, the memory 1203 may include a magnetic disk memory.

The processor 1201 may be a central processing unit (CPU), or the processor 1201 may be an application-specific integrated circuit (ASIC), or the processor 1201 may be one or more integrated circuits configured to implement this embodiment of the present disclosure.

It can be learned from the foregoing descriptions that, in some feasible implementations or the present disclosure, user equipment is provided. The user equipment is corresponding to the radio resource management apparatus in the embodiment in FIG. 9, and may execute the radio resource management method in the embodiment in FIG. 6, and achieve technical effects that can be achieved in the method in the embodiment in FIG. 6. For example, the processor 1201 may perform the actions of the processing unit 902 in FIG. 9, and the transceiver 1202 may perform the actions of the transceiver unit 901 in FIG. 9.

An embodiment of the present disclosure further provides a computer readable storage medium storing one or more programs. The one or more programs include an instruction, and when the instruction executed by a network control device including one or more processors, the network control device executes the radio resource management method in the embodiment in FIG. 3.

An embodiment of the present disclosure further provides a computer readable storage medium storing one or more programs. The one or more programs include an instruction, and when the instruction is executed equipment including one or more processors, the user equipment executes the radio resource management method in the embodiment in FIG. 6.

In the foregoing embodiments, the description of each embodiment has respective focuses. For a part that is not described in detail in an embodiment, refer to related descriptions in other embodiments.

It should be noted that, for ease of description, the foregoing method embodiments are described as a series of actions. However, a person skilled in the art should understand that the present disclosure is not limited to the described sequence of the actions, because some steps may be performed in another sequence or performed at the same time according to the present disclosure. In addition, a person skilled in the art should also appreciate that all the embodiments described in the specification are preferred embodiments, and the related actions and modules are not necessarily mandatory to the present disclosure.

It may be clearly understood by a person skilled in the art that, for the purpose of convenient and brief description, for a detailed working process of the foregoing system, apparatus, and unit, refer to a corresponding process in the foregoing method embodiments, and details are not described herein.

In the several embodiments provided is application, it should be understood that, the disclosed system, apparatus, and method may be implemented in other manners. For example, the described apparatus embodiment is only an example. For example, the unit division is only logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual needs to achieve the objectives of the solutions of the embodiments.

In addition, function units in the embodiments of the present disclosure may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions of the present disclosure essentially or the part contributing to the prior art, or all or some of the technical solutions may be implemented in the form of a software product. The software product is stored in a storage medium and includes several instructions for instructing a computer device (which may be a personal computer, a server, a network device, or the like) to perform all or some of the steps of the methods in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The radio resource management method and apparatus provided is the embodiments of the present disclosure are described in detail above. In this specification, the principle and implementations of the present disclosure are described by using specific examples. The description of the embodiments of the present disclosure is only intended to help understand the method and core idea of the present disclosure. In addition, a person of ordinary skill in the art can make variations and modifications to specific implementations and application scopes based on the ideas of the present disclosure. Therefore, content of this specification shall not be construed as a limitation on the present disclosure.

What is claimed is:

1. A radio resource management method comprising:
sending, to a second network device by a first network device, a first configuration message for configuring the second network device to establish a first RRC connection and a first user-plane connection with a user equipment, wherein the first network device has established a second RRC connection and a second user-plane connection with the user equipment;
informing, by the first network device, a third network device to establish a third user-plane connection with the user equipment, wherein the third network device transmits same data via the third user-plane connection as the second network device transmits via the first user-plane connection;
sending, to the user equipment by the first network device via the second RRC connection, a second configuration message for configuring the user equipment to establish the first RRC connection and the first user-plane connection with the second network device; and
notifying, by the first network device, the user equipment to establish the third user-plane connection with the third network device.

2. The method of claim 1, wherein the third network device is configured to:
not perform data transmission with the user equipment when in inactive state; and
perform data transmission with the user equipment when in active state.

3. The method of claim 2, further comprising one or more of:
sending, to the user equipment by the first network device, a first activity indication indicating to the user equipment to perform data transmission with the third network device; or
sending, to the third network device by the first network device, a second activity indication indicating to the third network device to perform data transmission with the user equipment.

4. The method of claim 3, wherein sending either the first activity indication or the second activity indication occurs based on a trigger comprising one of:
the first network device determines to refresh a key for the first network device or the second network device;
the user equipment generates new traffic data;
the user equipment needs handover; or
the first network device detects the user equipment is out-of-synchronization.

5. The method of claim 4, further comprising:
removing, by the first network device, the second network device; and
using, by the first network device, the third network device to perform the data transmission continuously.

6. The method of claim 1, wherein the user equipment is configured as part of a multi-connectivity infrastructure.

7. The method of claim 1, wherein the first network device is a master enhanced-node B (MeNB), and wherein the second network device and the third network device are secondary eNBs(SeNB).

8. An apparatus comprising:
one or more processors; and
a non-transitory storage medium in communication with the one or more processors, wherein the non-transitory storage medium is configured to store instructions which, when executed by the one or more processors, cause the apparatus to:
send, to a second network device, a first configuration message for configuring the second network device to establish a first RRC connection and a first user-plane connection with a user equipment, wherein the first network device has established a second RRC connection and a second user-plane connection with the user equipment; and
inform a third network device to establish a third user-plane connection with the user equipment, wherein the third network device transmits same data via the third user-plane connection as the second network device transmits via the first user-plane connection;
send, to the user equipment via the second RRC connection, a second configuration message for configuring the user equipment to establish the first RRC connection and the first user-plane connection with the second network device; and
notify the user equipment to establish the third user-plane connection with the third network device.

9. The apparatus of claim 8, wherein the third network device is configured to not perform data transmission with the user equipment when the third network device is in inactive state, and wherein the third network device is configured to perform data transmission with the user equipment when the third network device is in active state.

10. The apparatus of claim 9, wherein the instructions further cause the apparatus to:
send, to the user equipment, a first activity indication indicating to the user equipment to perform data transmission with the third network device; and/or
send, to the third network device a second activity indication indicating to the third network device to perform data transmission with the user equipment.

11. The apparatus of claim 10, wherein the apparatus sends the first activity indication or the second activity indication based on a trigger, wherein the trigger comprises one of:
the first network device determines to refresh a key for the first network device and/or the second network device;
the user equipment generates new traffic data;
the user equipment needs handover; or
the first network device detects the user equipment is out-of-synchronization.

12. The apparatus of claim 11, wherein the instructions further cause the apparatus to:
remove the second network device; and
use the third network device to perform the data transmission continuously.

13. An apparatus comprising:
one or more processors; and
a non-transitory storage medium in communication with the one or more processors, wherein the non-transitory storage medium is configured to store instructions which, when executed by the one or more processors, cause the apparatus to:

receive, from a first network device via a second RRC connection a second configuration message for configuring a user equipment to establish a first RRC connection and a first user-plane connection with a second network device, wherein the user equipment has established the second RRC connection and a second user-plane connection with the first network device;

receive, from the first network device a notification to establish a third user-plane connection with a third network device; and establish, the third user-plane connection with the third network device, wherein the third network device transmits same data via the third user-plane connection as the second network device transmits via the first user-plane connection.

14. The apparatus of claim 13, wherein the instructions further cause the apparatus to receive, from the first network device a first activity indication indicating to the user equipment to perform data transmission with the third network device.

15. The apparatus of claim 13, wherein the instructions further cause the apparatus to send, to the first network device or the second network device, a first RRC message with an indication indicating the destination of the first RRC message.

16. The apparatus of claim 13, wherein the instructions further cause the apparatus to send, to the first network device or the second network device a second RRC message associated with a specific logical channel.

17. The apparatus of claim 13, wherein the instructions further cause the apparatus to send, to the first network device or the second network device, a second RRC message associated with a specific logical channel identity.

18. The apparatus of claim 13, wherein the instructions further cause the apparatus to send, to the first network device or the second network device a second RRC message associated with a specific signaling radio bearer (SRB).

19. The apparatus of claim 13, wherein the user equipment is configured as part of a multi-connectivity infrastructure.

20. The apparatus of claim 13, wherein the first network device is a master enhanced-node B(MeNB), and wherein the second network device and the third network device are secondary eNBs(SeNB).

* * * * *